(12) United States Patent
Yamagishi

(10) Patent No.: US 7,277,124 B2
(45) Date of Patent: Oct. 2, 2007

(54) IMAGE SENSING APPARATUS, INFORMATION PROCESSING APPARATUS, CONTROL METHOD FOR THESE APPARATUSES, IMAGE PROCESSING APPARATUS AND METHOD, AND IMAGE PROCESSING SYSTEM

(75) Inventor: Yoichi Yamagishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 683 days.

(21) Appl. No.: 10/201,982

(22) Filed: Jul. 25, 2002

(65) Prior Publication Data
US 2003/0025796 A1   Feb. 6, 2003

(30) Foreign Application Priority Data
Jul. 31, 2001   (JP)   .............. 2001-232813

(51) Int. Cl.
H04N 5/225   (2006.01)
(52) U.S. Cl. .............. 348/207.2; 348/333.02; 348/552
(58) Field of Classification Search ............. 348/207.2, 348/207.1, 207.11, 207.99, 96
See application file for complete search history.

(56) References Cited

U.S. PATENT DOCUMENTS

| 5,815,665 | A  | * | 9/1998  | Teper et al. ............... 709/229 |
| 5,953,546 | A  | * | 9/1999  | Okada et al. ............... 396/272 |
| 6,327,001 | B1 |   | 12/2001 | Yamagishi ................. 348/552 |
| 6,668,134 | B1 | * | 12/2003 | Niikawa ..................... 386/95 |
| 6,727,973 | B2 | * | 4/2004  | Mizumo ...................... 355/40 |
| 6,798,532 | B1 | * | 9/2004  | Okino ....................... 358/1.15 |
| 6,806,975 | B1 | * | 10/2004 | Fujita et al. ............... 358/1.14 |
| 6,812,962 | B1 | * | 11/2004 | Fredlund et al. .......... 348/231.2 |
| 6,833,861 | B2 | * | 12/2004 | Matsumoto et al. ...... 348/207.2 |
| 6,915,273 | B1 | * | 7/2005  | Parulski ...................... 705/26 |
| 6,922,255 | B1 | * | 7/2005  | Tomida ..................... 358/1.15 |
| 7,034,880 | B1 | * | 4/2006  | Endsley et al. .......... 348/333.11 |
| 7,038,714 | B1 | * | 5/2006  | Parulski et al. ........... 348/207.2 |
| 2001/0048535 | A1 | * | 12/2001 | Usami ...................... 358/1.18 |

FOREIGN PATENT DOCUMENTS

JP   07168980 A   *   7/1995

OTHER PUBLICATIONS

U.S. Appl. No. 10/244,465, filed Sep. 17, 2002.

* cited by examiner

Primary Examiner—Ngoc-Yen Vu
Assistant Examiner—Adam L Henderson
(74) Attorney, Agent, or Firm—Fitzpatrick, Cella, Harper & Scinto

(57) ABSTRACT

A system which allows a user to transmit image data to a print laboratory technician and receive photo prints at a shop suffers cumbersome personal identification when the print laboratory technician reliably hands photo prints. To solve this problem, an electronic camera transmits image sensing data, and designation information which designates a print service which should print the image sensing data. An image gateway transmits the received image sensing data and a printing instruction for the image sensing data to the print service designated by the received designation information. Upon confirming that the print service has received the image sensing data and printing instruction, the image gateway transmits, to the electronic camera, receipt information which corresponds to the printing instruction and is used to receive a print.

5 Claims, 16 Drawing Sheets

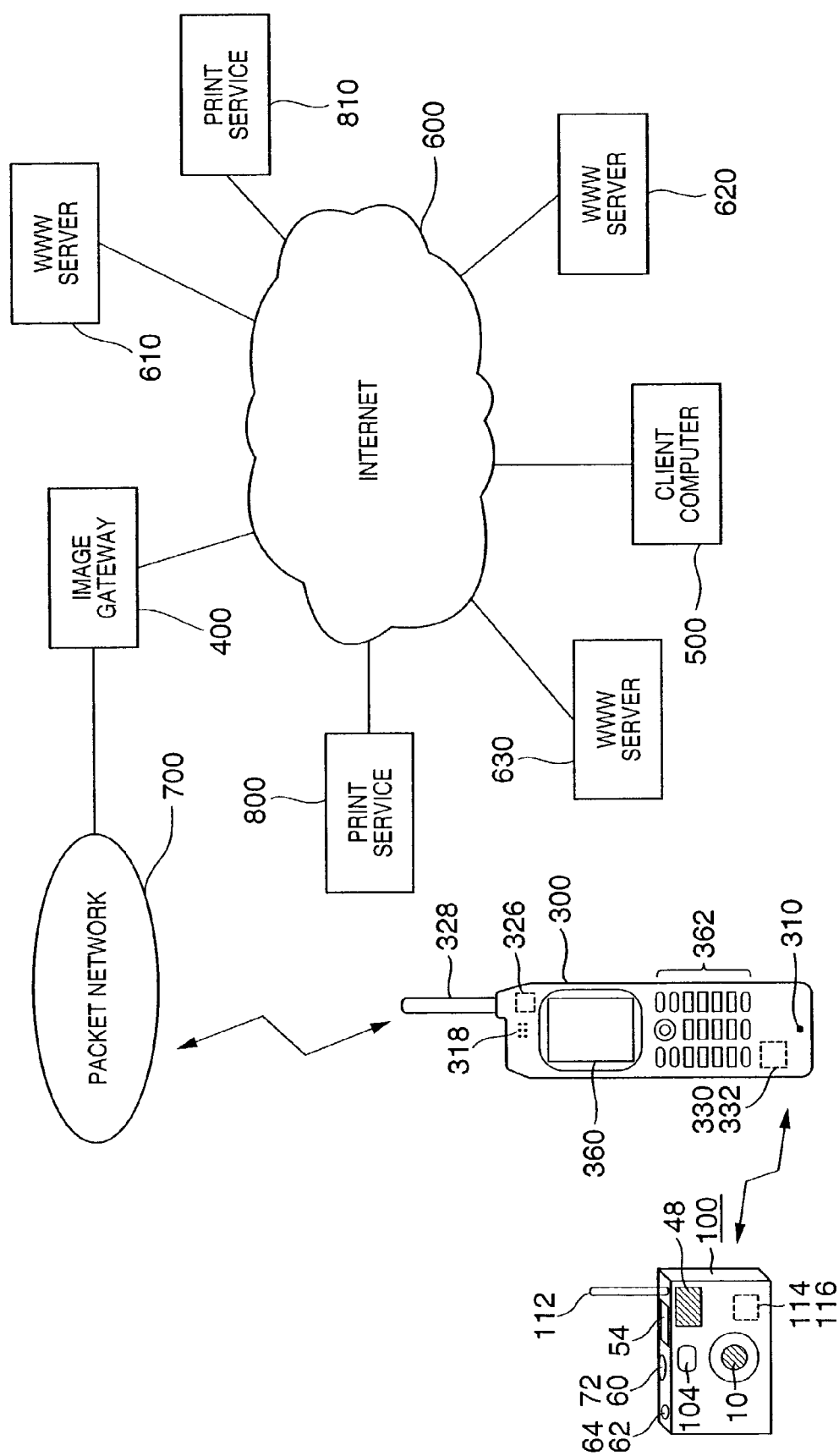

IMAGE SENSING APPARATUS, INFORMATION PROCESSING APPARATUS, CONTROL METHOD FOR THESE APPARATUSES, IMAGE PROCESSING APPARATUS AND METHOD, AND IMAGE PROCESSING SYSTEM

FIELD OF THE INVENTION

The present invention relates to an image sensing apparatus, an image processing apparatus, a control method for these apparatuses, an image processing apparatus and method, and an image processing system and, more particularly, to an image processing system which prints an image photographed by an image sensing apparatus.

BACKGROUND OF THE INVENTION

Image sensing apparatuses such as an electronic camera which uses a memory card having a solid-state memory element as a recording medium, and records, plays back, and/or communicates still and moving images are commercially available. Image sensing systems which store sensed images in a World Wide Web (WWW) server connected to a wide area network such as the Internet and lay open the images to the public are also constructed. Network printers which print images stored in the WWW server are also put on the market. Photo print services are offered which transmit sensed image data to a print laboratory technician via the WWW server and allow a user to receive printed photos at a shop.

The image sensing system allows transmitting images stored in the WWW server to a network printer or print laboratory technician connected to the Internet and printing the images.

There is also examined a business model which suggests selling electronic cameras at, e.g., a convenience store or sightseeing place at relatively low cost, earning a profit by repetitive use of photo print services via a portable telephone network or network, and recovering the cost of electronic cameras sold at low cost.

The system which transmits image data to a print laboratory technician and allows a user to receive photo prints at a shop suffers cumbersome personal identification when the print laboratory technician reliably hands photo prints.

If a profit is to be earned by selling an electronic camera or the like at low cost, but the electronic camera or the like is discarded after image data is transmitted to the print laboratory technician via a portable telephone network or network, the cost of the sold electronic camera or the like cannot be recovered.

The user can also bring a recording medium which stores sensed images to the shop of the print laboratory technician and order photo printing by a simple procedure similar to conventional silver halide photo printing. However, the storage capacity of the recording medium restricts the number of photographable images. To sense many images, the user must prepare many large-capacity recording media.

SUMMARY OF THE INVENTION

It is an object of the present invention to solve the above-described problems individually or simultaneously, and minimize the labor of handing prints.

It is another object of the present invention to more reliably recover the cost of a sold image sensing apparatus.

It is still another object of the present invention to withdraw the restriction on the number of photographable images by the storage capacity of a recording medium in an image sensing apparatus.

To achieve the above object, according to still another preferred aspect of the present invention, there is disclosed an image processing system comprising: a camera which transmits image sensing data, and designation information designating a printing apparatus which is to print the image sensing data; and an information processing apparatus which receives the image sensing data and the designation information from the camera, and transmits the received image sensing data and a printing instruction for the image sensing data to the printing apparatus designated by the designation information, wherein after confirming that the printing apparatus has received the image sensing data and the printing instruction, the information processing apparatus transmits, to the camera, receipt information which corresponds to the printing instruction and is used to receive a print.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 16 is a view showing a system configuration according to the second embodiment.

DETAILED DESCRIPTION OF THE PREFERRED EMBODIMENTS

An image processing apparatus according to preferred embodiments of the present invention will be described in detail below with reference to the accompanying drawings.

First Embodiment

Figure 1:
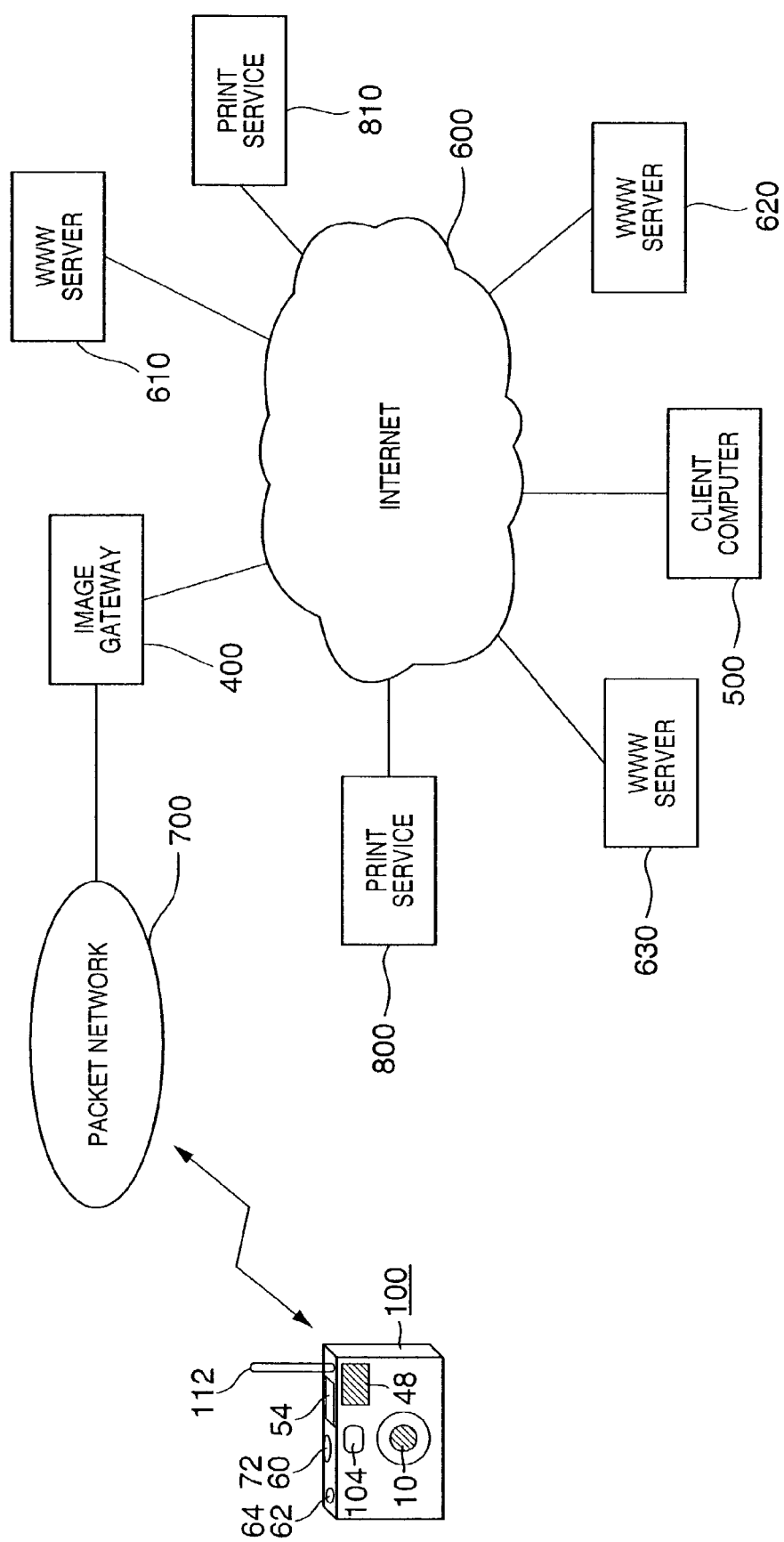
FIG. 1 is a view showing a system configuration according to the first embodiment.

FIG. 1 is a view showing a system configuration according to the first embodiment.

In FIG. 1, an electronic camera (image sensing apparatus) 100 has a communication section and an antenna 112. The electronic camera 100 can communicate with an information processing apparatus such as an image gateway (image information management apparatus) 400 via, e.g., a packet network 700 for a portable telephone.

The image gateway 400 which connects the packet network 700 and a WAN such as Internet 600 can be connected via the Internet 600 to a client computer 500 (including an information processing apparatus such as a portable information device or portable telephone) used by the user, WWW servers 610, 620, and 630, and print services 800 and 810 of a printing apparatus.

The WWW servers 610, 620, and 630 are servers which distribute various pieces of content information via the Internet 600.

[Arrangement of Electronic Camera]

Figure 2:
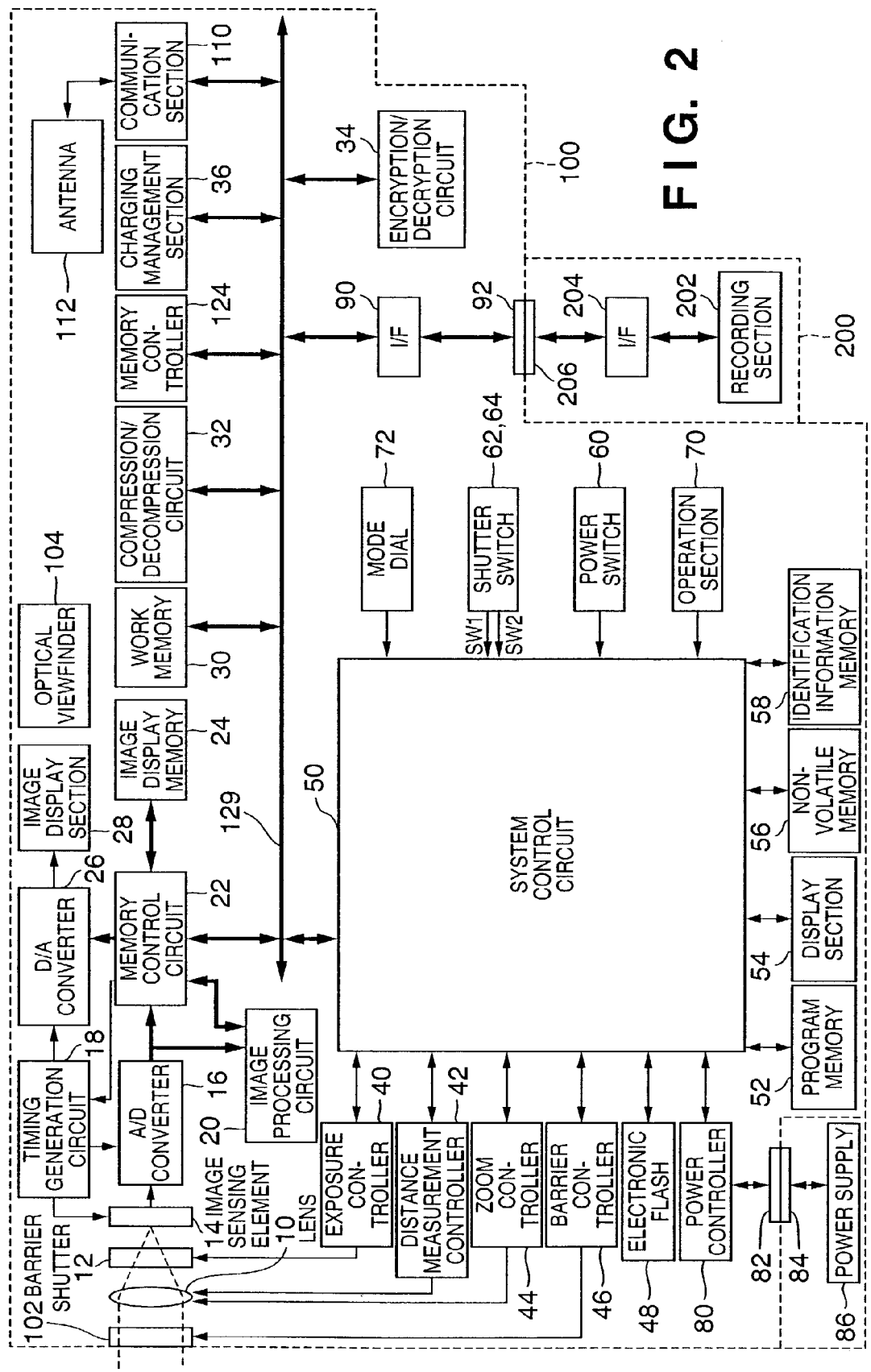
FIG. 2 is a block diagram showing the arrangement of an electronic camera.

FIG. 2 is a block diagram showing the arrangement of the electronic camera 100. FIG. 1 shows the schematic layout of a corresponding arrangement.

In FIG. 2, reference numeral 10 denotes a photographing lens; 12, a shutter with an aperture function; 14, an image sensing element which converts an optical image into an electrical signal; and 16, an analog-to-digital (A/D) converter which converts an analog signal output from the image sensing element 14 into a digital signal.

A timing generation circuit 18 supplies clock signals and control signals to the image sensing element 14, the A/D converter 16, and a D/A converter 26, and is controlled by a memory control circuit 22 and system control circuit 50.

An image processing circuit 20 performs predetermined pixel interpolation processing and color conversion processing for data output from the A/D converter 16 or data sent from the memory control circuit 22. The image processing circuit 20 performs predetermined arithmetic processing for image data to be sensed (to be referred to as "image sensing data" hereinafter). The obtained arithmetic result is utilized for the system control circuit 50 to control an exposure controller 40 and distance measurement controller 42 and execute Through The Lens (TTL) autofocus (AF) processing, automatic exposure (AE) processing, and electronic flash pre-emission (EF) processing. The image processing circuit 20 performs predetermined arithmetic processing for image sensing data, and also performs TTL automatic white balance (AWB) based on the obtained arithmetic result.

The memory control circuit 22 controls the A/D converter 16, the timing generation circuit 18, the image processing circuit 20, an image display memory 24, the D/A converter 26, a work memory 30, and a compression/decompression circuit 32. Data output from the A/D converter 16 is written in the image display memory 24 or work memory 30 via the image processing circuit 20 or directly via the memory control circuit 22.

Display image data written in the image display memory 24 is sent to an image display section 28 formed from a TFT LCD and the like via the D/A converter 26, thereby displaying an image. Sequentially sending image sensing data to the image display section 28 can realize an electronic viewfinder function. The display of the image display section 28 can be arbitrarily turned on/off by an instruction from the system control circuit 50. When the display and backlight are turned off, the power consumption of the electronic camera 100 can be greatly reduced.

The work memory 30 which is formed from a semiconductor RAM and the like and stores sensed still and moving images has a storage capacity enough to store a predetermined number of still images or a moving image of a predetermined period. Even in panoramic photography or sequential shooting photography of successively photographing a plurality of still images, high-speed photography can be achieved by writing a large amount of image data in the work memory 30 at high speed. The work memory 30 can also be used as the work area of the system control circuit 50.

The compression/decompression circuit 32 which compresses/decompresses image data by an image compression method using adaptive discrete cosine transform (ADCT) or the like loads image data stored in the work memory 30, compresses/decompresses the image data, and writes the compressed/decompressed image data in the work memory 30 again.

If necessary, an encryption/decryption circuit 34 encrypts sensed image data stored in a predetermined area of the work memory 30. In playing back and displaying the encrypted image data stored in the predetermined area of the work memory 30, the encryption/decryption circuit 34 decrypts the image data. Encrypted image data can also be decrypted by the encryption/decryption circuit of the image gateway 400, details of which will be described later. Encryption/decryption processing is executed in association with charging database information of a charging management section 420 of the image gateway 400 (to be described later).

A charging management section 36 updates and manages charging information in accordance with execution of photographing processing, transmission of image data to the image gateway 400, and/or reception of image data from the image gateway 400.

The exposure controller 40 which controls the shutter 12 having a stop function also has an electronic flash light control function in association with an electronic flash 48. The electronic flash 48 has an auxiliary AF light projecting function and electronic flash light control function. The distance measurement controller 42 controls focusing of the photographing lens 10. A zoom controller 44 controls zooming of the photographing lens 10. A barrier controller 46 controls the operation of a barrier 102 which protects the lens 10.

As described above, the exposure controller 40 and distance measurement controller 42 are controlled by the TTL method. That is, the system control circuit 50 controls the exposure controller 40 and distance measurement controller 42 on the basis of the arithmetic results of calculating image sensing data by the image processing circuit 20.

The system control circuit 50 controls the overall electronic camera 100. A program memory 52 stores a constant, variable, and program for the operation of the system control circuit 50.

A display section 54 displays the operation state and setting state of the electronic camera 100 and various messages by using characters, signs, images (icons), and the like in accordance with the execution of a program by the system control circuit 50. The display section 54 is arranged as a single unit or a plurality of units at easy-to-see positions near the operation section of the electronic camera 100. In general, the display section 54 is made up of an LCD and indicators such as LEDs and lamps. The display section 54 can also output a warning sound, sound message, and the like in combination with a sound generating element. Some of the functions of the display section 54 are arranged to overlap each other within an optical viewfinder 104.

Information displayed on the LCD of the display section 54 includes the setting of single shot/sequential shooting photographing, the setting of a self-timer, the image compression ratio, the number of recording pixels, the number of recording images, the remaining number of photographable images, the shutter speed, the aperture value, the setting of exposure correction, the setting of an electronic flash, the setting of pink-eye reduction, the setting of macro photography, the setting of a beeper, the residual capacity of a timepiece battery, the residual capacity of a battery, the error status, information represented by a number of a plurality of digits, the insertion/removal states of recording media 200 and 210, the operation of a communication interface (I/F), the date and time, and the connection state to an external computer.

Of display information on the display section 54, information displayed on the optical viewfinder 104 includes an in-focus state, completion of photographing preparation, a camera shake warning, an electronic flash charging state, completion of charging the electronic flash, the shutter speed, the aperture value, an exposure compensation state, and write operation of a recording medium.

Information displayed on an indicator such as the LED of the display section 54 includes an in-focus state, completion of photographing preparation, a camera shake warning, an electronic flash charging state, completion of charging the electronic flash, write operation of a recording medium, a macro photography setting notification, and the charging state of a secondary battery.

Information displayed on an indicator such as the lamp of the display section 54 is, e.g., a self-timer notification. The self-timer notification lamp can also be used as an auxiliary AF light source.

An electrically erasable/programmable nonvolatile memory 56 is an EEPROM or the like.

An identification information memory 58 stores authentication information necessary to communicate with the image gateway 400 via the packet network 700, and various pieces of identification information necessary for charging management in storing and extracting image data. Identification information for specifying and managing each electronic camera 100 is stored in the manufacture or the like before the user uses the electronic camera 100. These pieces of information are used to update the charging information database when the image gateway 400 provides various services to the electronic camera 100.

Reference numerals 60, 62, 64, 70, and 72 denote input devices for inputting various instructions to the system control circuit 50. The input devices are constituted by input devices such as a switch, a dial, a touch panel, a pointing device by line-of-sight detection, and a voice recognition device singly or by combinations of them.

The power switch 60 switches the power-on/off state of the electronic camera 100. The power switch 60 also switches the power-on/off states of various attachments such as a lens unit and external electronic flash (not shown) connected to the electronic camera 100, and the recording medium 200.

The shutter switch 62 (SW1) is turned on by half-pressing the shutter button. After the shutter switch 62 is ON, AF processing, AE processing, AWB processing, and EF processing start.

The shutter switch 64 (SW2) is turned on by fully pressing the shutter button. After the shutter switch 64 is ON, a series of processes start. These processes include exposure processing of writing via the memory control circuit 22 in the work memory 30 image data which is read by the image sensing element 14 and A/D-converted by the A/D converter 16, developing processing of performing arithmetic processing by the image processing circuit 20 for image data which is read out from the work memory 30 by the memory control circuit 22, and recording processing of compressing by the compression/decompression circuit 32 image data read out from the work memory 30 and writing the compressed data in the recording medium 200.

The operation section 70 made up of a button, touch panel, and the like has a menu button, a set button, a macro button, a multiwindow (index) playback/page break button, an electronic flash setting button, a single shooting/sequential shooting/self-timer switching button, a menu moving "plus (+)" button, a menu moving "minus (−)" button, a playback image moving "plus (+)" button, a playback image moving "minus (−)" button, a photographing image quality selection button, an exposure compensation button, a date/time setting button, an image display ON/OFF button used to set the ON/OFF state of the image display section 28, and a quick review ON/OFF button used to set a quick review function of automatically playing back a photographed image on the image display section 28 immediately after photographing.

The mode dial 72 is a dial for switching the function mode of the electronic camera 100. The mode dial 72 can switch the function mode between "photographing mode", "playback/erase mode", "print service mode", and "communication mode". The photographing mode includes an automatic photographing mode, a program photographing mode, a shutter speed priority photographing mode, an aperture priority photographing mode, a manual exposure photographing mode, a focal depth of field priority (depth) photographing mode, a portrait photographing mode, a landscape photographing mode, a close-up photographing mode, a sports photographing mode, a night scene photographing mode, and a panoramic photographing mode. The playback/erase mode includes a playback mode and a multiwindow (index) playback mode and erase mode. The communication mode includes a PC connection mode.

The mode dial 72 allows selecting a JPEG mode of selecting the compression ratio of JPEG (Joint Photographic Experts Group) compression, or a CCD-RAW mode of directly digitizing a signal from an image sensing element and recording the signal on the recording medium 200. In the JPEG mode, for example, normal and fine modes are prepared. When the user of the electronic camera 100 attaches importance to the data size of a photographing image, he/she can select the normal mode with high compression ratio and photograph an object. When the user attaches importance to the image quality of a photographing image, he/she can select the fine mode with low compression ratio or the CCD-RAW mode, and photograph an object.

In the JPEG mode, a signal output from the image sensing element 14 is converted into image data by the A/D converter 16. The image data is written in the work memory 30 via the image processing circuit 20 and memory control circuit 22. The image data is read out from the work memory 30, and subjected to JPEG compression at a compression ratio set by the compression/decompression circuit 32. Image data (to be referred to as "JPEG data" hereinafter) encrypted by the encryption/decryption circuit 34, as needed, is recorded on the recording medium 200.

In the CCD-RAW mode, signals are directly read out every line in accordance with the pixel array of the color filter of the image sensing element 14, and converted into digital data (to be referred to as "RAW data" hereinafter) by the A/D converter 16. The RAW data is written in the work memory 30 via the memory control circuit 22. The RAW data read out from the work memory 30 is encrypted by the encryption/decryption circuit 34, as needed, and recorded on the recording medium 200. The RAW data may be recorded without any compression, but may undergo lossless compression. By performing lossless compression after developing processing, the RAW data can be converted into another normal image format.

A power controller 80 is constituted by a battery detection circuit, a DC-DC converter, and a switching circuit which switches a block to be energized. The power controller 80 detects the mounting/dismounting of a battery, the type of battery, and the residual capacity of the battery. The power controller 80 controls the DC-DC converter on the basis of a detection result and an instruction from the system control circuit 50, and supplies necessary power to the respective sections including the recording medium for a necessary period. A power supply 86 is formed from a primary battery such as an alkaline cell or lithium cell, a secondary battery such as an NiCd battery, NiMH battery, or Li-ion battery, or a power adaptor. The power supply 86 is detachably connected to the power controller 80 via connectors 82 and 84.

An interface (I/F) 90 connects a system bus 129 of the electronic camera 100, and a recording medium such as a memory card or hard disk detachably connected via a connector 92.

This embodiment adopts one interface and one connector for connecting a recording medium. However, the number of interfaces or connectors may be one or more. As the interface and connector, those which comply with the standard of a PCMCIA (Personal Computer Memory Card International Association) card or compact flash (CF) card can be used. Two interfaces and two connectors may comply with different standards.

If the interface and connector comply with the standard of the PCMCIA card or CF card, they enable connecting various communication cards such as a LAN card, MODEM card, USB (Universal Serial Bus) card, IEEE 1394 card, IEEE 1284 card, SCSI (Small Computer System Interface) card, and PHS (Personal Handy-phone System) communication card. The interface and connector can communicate image data and management information accessory to the image data with another peripheral device such as a computer or printer.

The recording medium 200 is a recording medium such as a memory card or hard disk. The recording medium 200 comprises a recording section 202 formed from a semiconductor memory, magnetic disk, or the like, and an interface 204 and connector 206 for connecting the recording medium 200 to the electronic camera 100.

The barrier 102 mechanically covers an image sensing section including the lens 10, thereby protecting the image sensing section and preventing any dust deposition or damage.

The optical viewfinder 104 allows the user to optically observe the photographing range without using any electronic viewfinder function of the image display section 28. As described above, some of the functions of the display section 54 are arranged within the optical viewfinder 104.

A communication section 110 has a portable telephone communication function of TDMA (Time Division Multiple Access) scheme, CDMA (Code Division Multiple Access) scheme, W-CDMA (Wideband Code Division Multiple Access) scheme, or PHS (Personal Handy-phone System) scheme. The communication section 110 comprises an antenna 112 for connecting the communication section 110 to another device.

The communication function of the communication section 110 may cope with various communication methods including wireless communication such as Bluetooth, wire communication such as RS232C, USB, IEEE 1394, IEEE 1284, SCSI, MODEM, and LAN, infrared communication such as IrDA (Infrared Data Association), and optical communication. The connector corresponds to the antenna 112 for wire communication, whereas the light transmission/reception section corresponds to the antenna 112 for infrared communication.

[Arrangement of Image Gateway]

Figure 3:
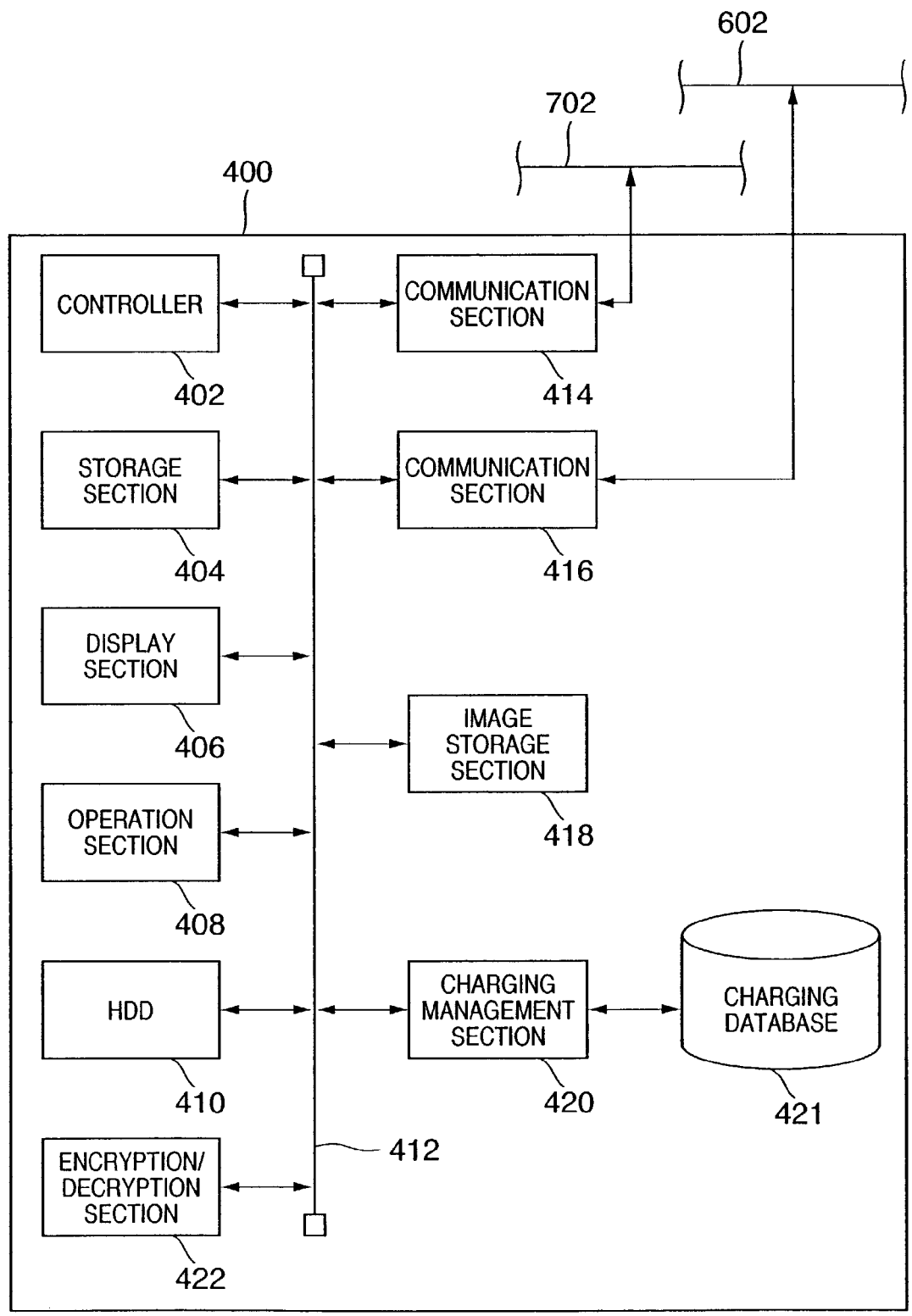
FIG. 3 is a block diagram showing the arrangement of an image gateway.

FIG. 3 is a block diagram showing the arrangement of the image gateway 400.

A controller 402 utilizes a storage section 404 as a work memory to execute various applications. Further, the controller 402 controls the whole image gateway 400 via a bus 412 which transfers data processed by the controller 402 to a unit (to be described later) or performs high-speed data transfer (DMA transfer) between units. As the storage section 404, an SDRAM (Synchronous DRAM) or RDRAM (Rambus DRAM) is generally used.

A display section 406 is constituted by an LCD, loudspeaker, and the like. The display section 406 displays necessary characters and images and plays back sound in accordance with execution of a program by the controller 402.

An operation section 408 is an operation means made up of a keyboard and a pointing device such as a mouse or track pad. The operation section 408 is used to input information necessary for the operation of the image gateway 400 and/or various operation instructions.

A hard disk drive (HDD) 410 stores an operating system (OS) and various application programs executed by the controller 402, and is managed by the controller 402.

A communication section 414 connects the image gateway 400 to the packet network 700 including a portable telephone network such as a telephone base station via the network 702, and exchanges data via the image gateway 400. A communication section 416 connects the image gateway 400 to the Internet 600 via a network 602, and exchanges data via the Internet 600. Networks 702 and 602 can generally be an Ethernet or the like.

An image storage section 418 sequentially accumulates image sensing data sent from the electronic camera 100 or the like. The controller 402 can read out image sensing data stored in a predetermined area of the image storage section 418 and transmit the data to a designated apparatus in accordance with a request from the electronic camera 100 and/or client computer 500. Storage/extraction of image sensing data in/from the image storage section 418 is synchronized with update of a charging database 421 by a charging management section 420.

In storing image sensing data in the image storage section 418 and/or extracting image sensing data stored in the image storage section 418, the charging management section 420 authenticates and identifies a device (electronic camera 100 or client computer 500) which has issued the image sensing data storage/extraction request. The charging management section 420 updates its charging database 421 in accordance with the identification result and image sensing data storage/extraction, and registers charging identification information of the electronic camera 100 and/or client computer 500.

Image sensing data can also be stored/extracted in/from the image storage section 418 by the WWW servers 610, 620, and 630. By similar authentication and identification, the charging database 421 of the charging management section 420 is updated in accordance with storage/extraction of the identification result and image sensing data storage/extraction, and charging identification information of the WWW server 610, 620, and/or 630 is registered. The WWW server 610, 620, and/or 630 may share the charging database 421.

The charging management section 420 can also store user information of the electronic camera 100 received from the electronic camera 100 in the charging database 421, and provide the electronic camera 100 with a program which expands the function of the electronic camera 100 in accordance with the registered user information.

An encryption/decryption section 422 encrypts/decrypts image sensing data received from the electronic camera 100 and/or client computer 500, as needed. Encryption/decryption processing is performed in synchronism with update of the charging database 421.

Encrypted image sensing data can also be decrypted by the encryption/decryption circuit 34 of the electronic camera 100. Also in this case, decryption is executed in synchronism with update of the charging database 421.

[Arrangement of Print Service]

Figure 4:
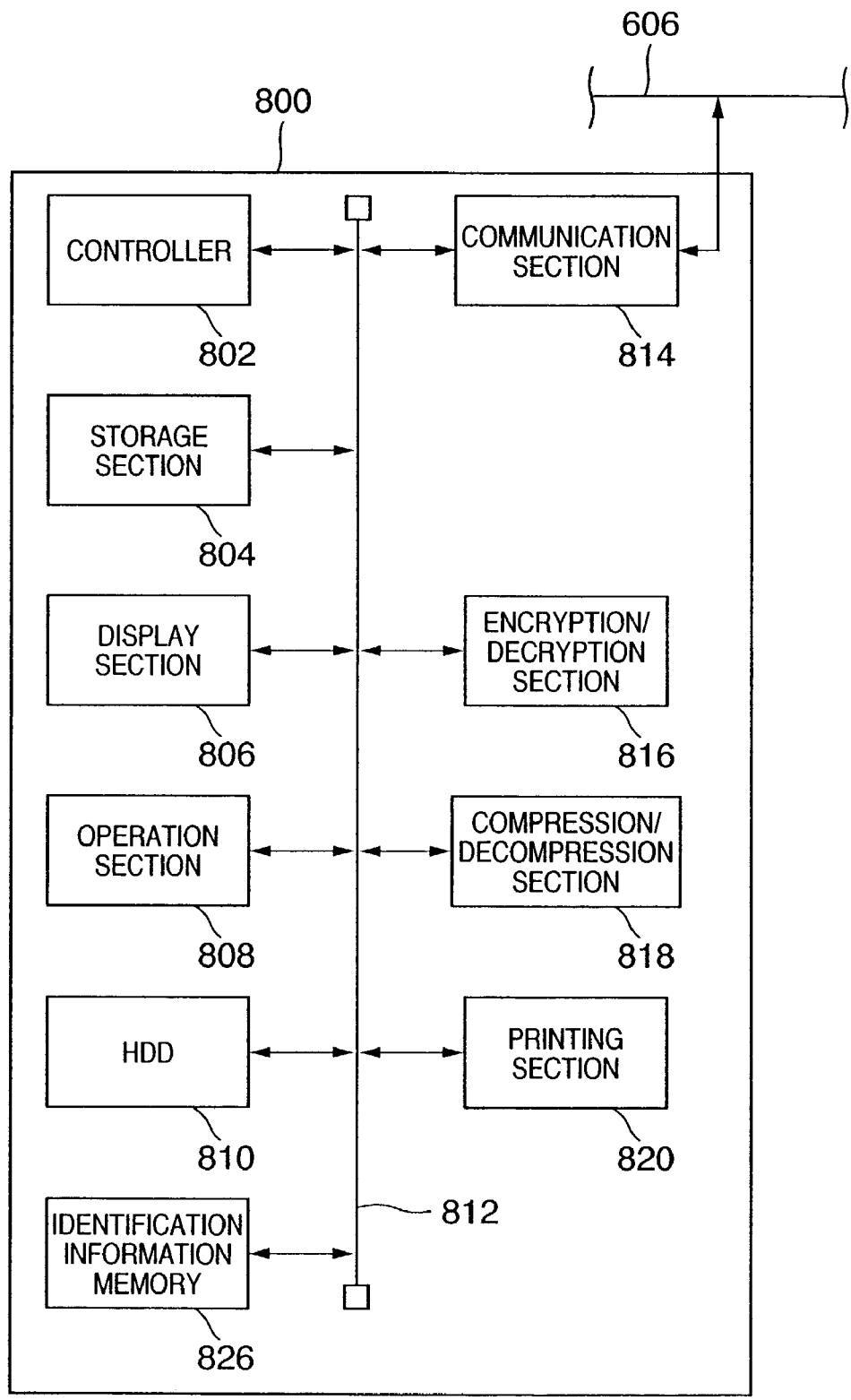
FIG. 4 is a block diagram showing the arrangement of an information processing apparatus which provides a print service.

FIG. 4 is a block diagram showing the arrangement of an information processing apparatus which provides the print service 800. In the following description, reference numeral 800 denotes the information processing apparatus which provides the print service.

A controller 802 utilizes a storage section 804 as a work memory to execute various applications. In addition, the controller 802 controls the whole information processing apparatus 800 via a bus 812 which transfers data processed by the controller 802 to a unit (to be described later) or performs high-speed data transfer (DMA transfer) between units. As the storage section 804, an SDPAM (Synchronous DRAM) or RDRAM (Rambus DRAM) is generally used.

A display section 806 is constituted by an LCD, loudspeaker, and the like. The display section 806 displays necessary characters and images and plays back sound in accordance with execution of a program by the controller 802.

An operation section 808 is an operation means made up of a keyboard and a pointing device such as a mouse or track pad. The operation section 808 is used to input information necessary for the operation of the information processing apparatus 800 and/or various operation instructions.

A hard disk drive (HDD) 810 stores an operating system (OS) and various application programs executed by the controller 802, and is managed by the controller 802.

A communication section 814 connects the information processing apparatus 800 to the Internet 600 via a network 606, and exchanges data via the Internet 600. The network 606 can generally be an Ethernet or the like.

An encryption/decryption section 816 encrypts/decrypts image sensing data received from the electronic camera 100, client computer 500, and/or image gateway 400, as needed. Encryption/decryption processing is performed in synchronism with update of the charging database 421 of the image gateway 400.

A compression/decompression section 818 compresses/decompresses image sensing data received from the electronic camera 100, client computer 500, and/or image gateway 400, as needed.

The controller 802 temporarily stores in the storage section 804 or HDD 810 image sensing data received from the electronic camera 100, client computer 500, and/or image gateway 400, reads out the stored image sensing data, and prints the data by a printing section 820. Printing of image sensing data by the printing section 820 is executed in synchronism with management of identification information stored in the charging database 421 of the image gateway 400 or identification information unique to a device such as the electronic camera 100.

An identification information memory 826 stores identification information for specifying and managing each information processing apparatus (print service) 800. By notifying another device of the identification information, the information processing apparatus (print service) 800 can exchange a command and data with the device.

[Operation of Electronic Camera]

The operation of the electronic camera 100 will be explained.

Main Routine

Figure 5:
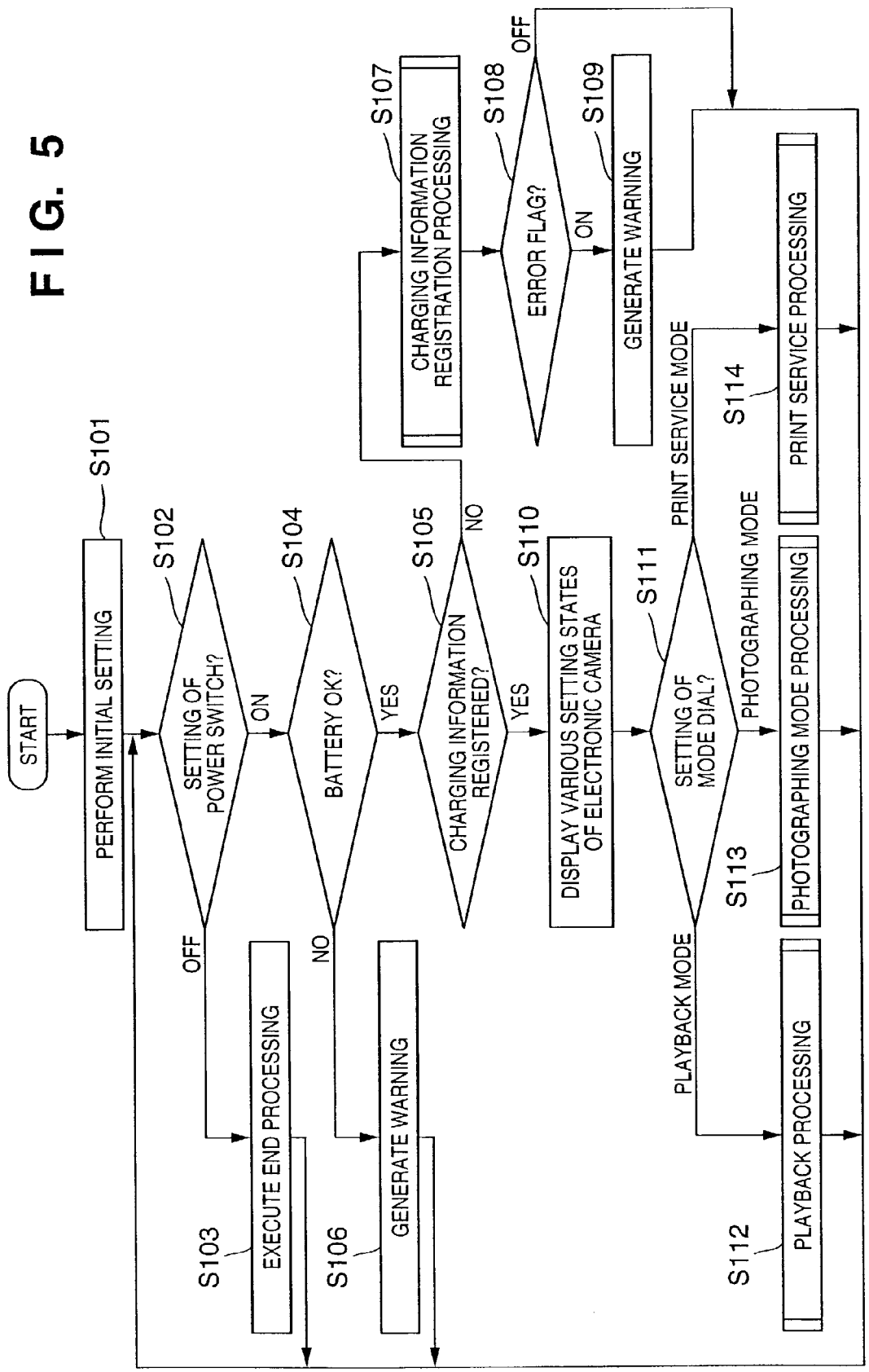
FIG. 5 is a flow chart showing the main routine of processing executed by the system controller of the electronic camera.

FIG. 5 is a flow chart showing the main routine of processing executed by the system controller 50 of the electronic camera 100 according to the first embodiment.

When, for example, the battery of the electronic camera 100 is exchanged, the system control circuit 50 initializes flags, control variables, and the like, initializes the respective sections of the electronic camera 100 (S101), and checks the setting of the power switch 60 (S102).

If the power switch 60 is OFF, the system control circuit 50 ends the display of the display section 54 or the like, and closes the barrier 102 to protect the image sensing section. The system control circuit 50 records in the nonvolatile memory 56 the setting mode, and necessary parameters and setting values including flags and control variables. The power controller 80 performs predetermined end processing of interrupting unnecessary power to respective sections including the image display section 28 (S103). Then, the system control circuit 50 returns the processing to step S102, and waits until the power switch 60 is turned on.

If the power switch 60 is ON, the system control circuit 50 checks via the power controller 80 whether the residual capacity and operation status of the power supply 86 formed from a battery or the like are sufficient for the operation of the electronic camera 100 (S104). If the residual capacity or operation status is insufficient, the system control circuit 50 branches the processing to step S106.

The system control circuit 50 checks the state of a charging registration execution flag stored in a predetermined area of the identification information memory 58 and/or nonvolatile memory 56. The system control circuit 50 determines whether charging information necessary for the electronic camera 100 to receive various services provided by the image gateway 400 has been registered (S105). If NO in step S105, the system control circuit 50 branches the processing to step S107.

If NO in step S105, the system control circuit 50 executes charging registration processing (details of which will be described later) of registering necessary charging information in the charging management section 420 of the image gateway 400 (S107). If an error flag representing the execution result of charging registration processing is not set (OFF) in a predetermined area of the internal memory or nonvolatile memory 56 of the system control circuit 50 (S108), the system control circuit 50 determines that charging registration processing normally ends. The system control circuit 50 ends the processing and returns it to step S102.

If the error flag is set (ON), the system control circuit 50 displays a predetermined warning by an image or sound by using the display section 54 and/or image display section 28 (S109). Then, the system control circuit 50 returns the processing to step S102.

If YES in step S105, the system control circuit 50 displays various setting states of the electronic camera 100 by an image or sound by using the display section 54 (S110). If the image display of the image display section 28 is ON, the system control circuit 50 also displays various setting states of the electronic camera 100 by an image or sound by using the image display section 28.

The system control circuit 50 checks the setting position of the mode dial 72 (S111), and executes processing (details of which will be described later) corresponding to the setting of the mode dial 72 (S112 to S114).

In the playback mode, the thinned (thumbnail) image of image sensing data can be played back and displayed on the image display section 28, which will be described in detail later. Detailed image data can also be downloaded from the image gateway 400, and played back and displayed.

In the photographing mode, image sensing data is uploaded to the image gateway 400.

The print service mode is processing of receiving from the print service 800 a print corresponding to image sensing data uploaded to the image gateway 400. More specifically, image sensing data is transferred from the image gateway 400 to the print service 800, and printed. At this time, receipt information necessary to receive the print is sent from the image gateway 400 to the electronic camera 100.

As will be explained in print service processing, the user of the electronic camera 100 provides (presents) the receipt information to (the clerk of) the print service 800, and receives the print. (The clerk of) the print service 800 collates the user by the receipt information, surely hands the print to the user of the electronic camera 100, and collects the print fee.

Receipt information is presented such that the user of the electronic camera 100 who visits the shop of a print laboratory technician in order to receive a print sets the operation mode of the electronic camera 100 to the print service mode, displays receipt information on the display section 54 or image display section 28, and presents the receipt information to the clerk. If the user is authentic as a result of collating the receipt information, the clerk hands the print. At the same time, the clerk operates the operation section 808 of the information processing apparatus 800 to notify the image gateway 400 of the collation result, and causes the image gateway 400 to update the charging database 421.

The print fee may be paid by updating the charging database 421 of the image gateway 400, or directly paying the charge from the user of the electronic camera 100 to the clerk at the shop. Alternatively, update of the charging database 421 and direct payment at a shop may be combined.

Registration of Charging Information

Figure 6:
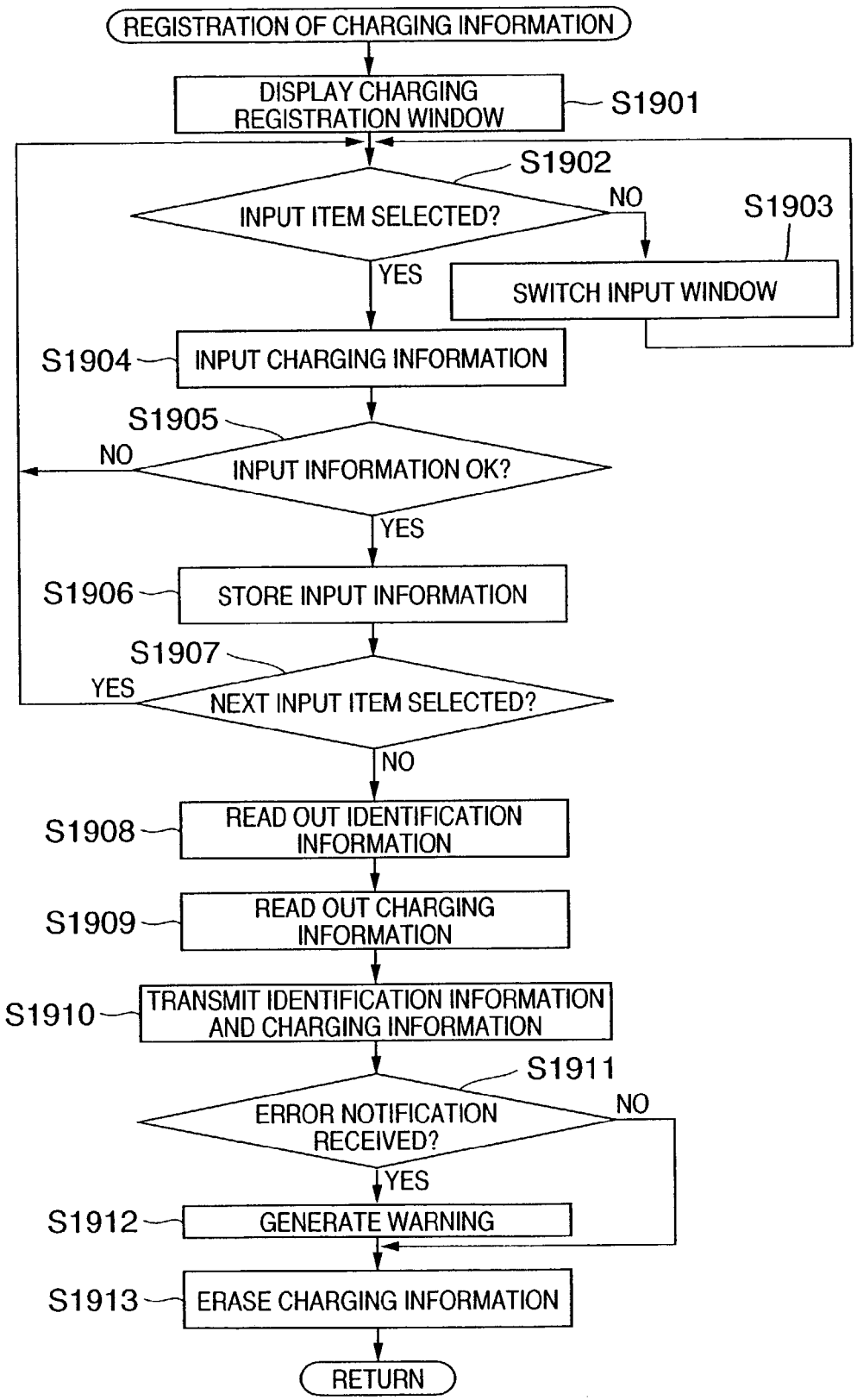
FIG. 6 is a flow chart showing registration of charging information.

FIG. 6 is a flow chart showing registration of charging information.

The system control circuit 50 displays a charging registration window on the image display section 28 (S1901). If the user of the electronic camera 100 operates the selection/switching switch and determination/execution switch of the operation section 70 and selects the input item of the charging registration window (S1902), the system control circuit 50 switches the input window in accordance with the selection (S1903). If the user of the electronic camera 100 inputs charging information by operating the selection/switching switch and determination/execution switch in correspondence with the display window (S1904), and the input charging information is OK (S1905), the input charging information is stored in the internal memory of the system control circuit 50 or the work memory 30 (S1906). If the input charging information is NG (S1905), or the next input item is selected (S1907), the system control circuit 50 returns the processing to step S1902.

The input items of charging information include includes the name, address, age, sex, e-mail address, occupation, hobby, and payment method. Selection (or list of selection candidates) of the print service 800 used to print image sensing data may be initially set using address information (or information about the office location or commuting route) input in step S1904.

Information about a main object to be photographed such as sports photographing, portrait photographing, or landscape photographing, information such as outdoor photographing, indoor photographing, or night scene photographing, or photographing information as a combination of them may be input as charging information.

After necessary input items are input, the system control circuit 50 reads out from the identification information memory 58 identification information unique to the device that is necessary to register charging information (S1908). The system control circuit 50 reads out charging information stored in the internal memory or work memory 30 (S1909), and transmits the identification information and charging information to the image gateway 400 via the communication section 110 or the like (S1910).

Identification information unique to the device includes pieces of information about the manufacturer code of the electronic camera 100, the device type code, the serial number, and the equipped function. The identification information can also include the user registration status of the electronic camera 100 and/or log information representing the use status of the electronic camera 100.

If the image gateway 400 sends back a registration notification after the identification information and charging information are transmitted, the system control circuit 50 determines that the charging information has been registered. Then, the system control circuit 50 erases the charging information stored in the internal memory or work memory 30 (S1913), and returns the processing to the main routine. If the image gateway 400 sends back an error notification (S1911), the system control circuit 50 displays a predetermined warning by an image or sound by using the display section 54 and/or image display section 28 (S1912), erases the charging information stored in the internal memory or work memory 30 (S1913), and returns the processing to the main routine.

Registration of charging information allows the electronic camera 100 to receive various services provided by the image gateway 400.

Photographing Mode Processing

Figure 7:
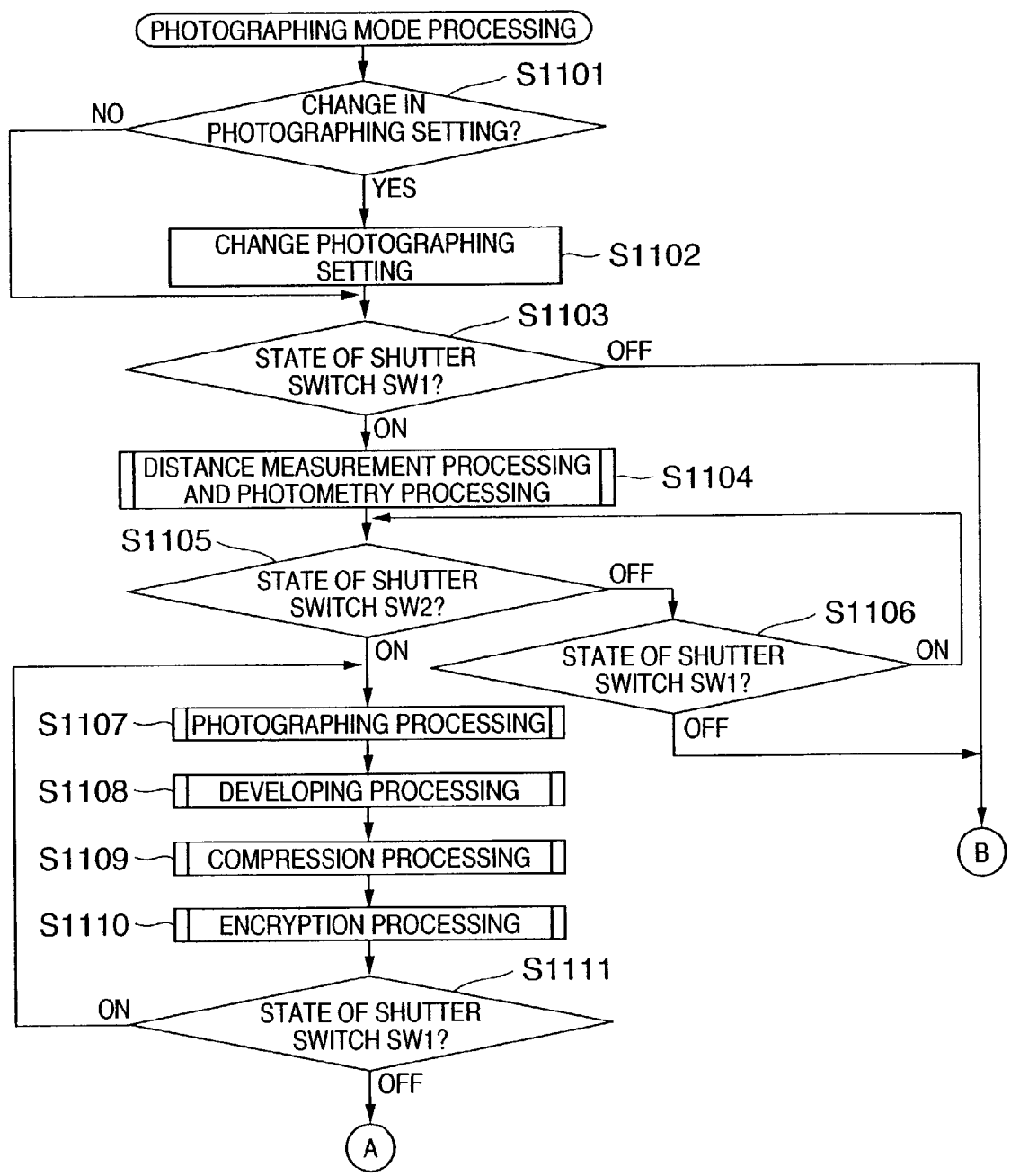
FIGS. 7 and 8 are flow charts showing photographing mode processing.
Figure 8:
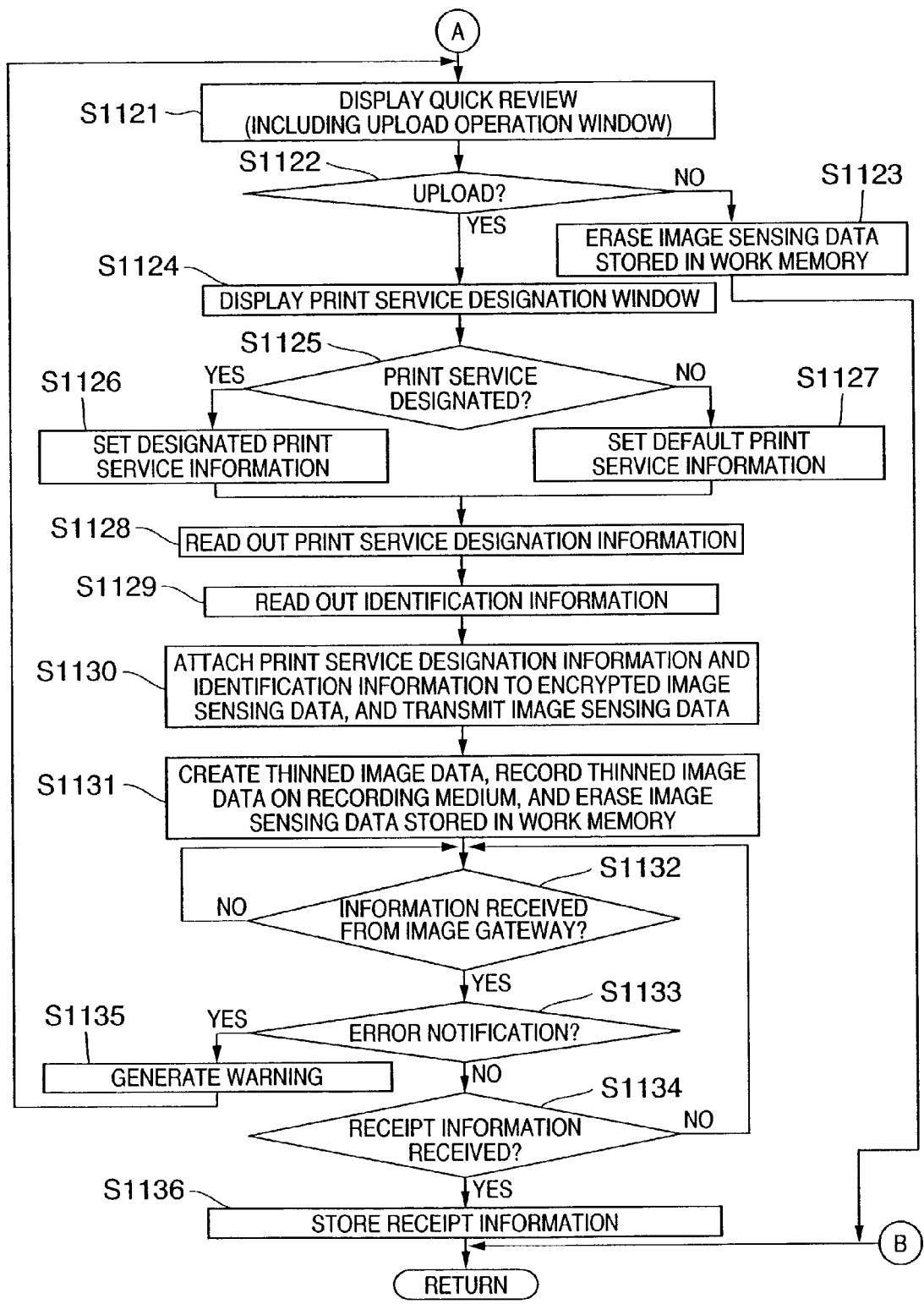

FIGS. 7 and 8 are flow charts showing photographing mode processing.

If the user operates various switches of the operation section 70 to change various photographing settings (S1101), the system control circuit 50 changes photographing settings in accordance with the contents (S1102).

The system control circuit 50 checks the state of the shutter switch SW1 (S1103), and if the shutter switch SW1 is OFF (not pressed), returns the processing to the main routine. If the shutter switch SW1 is ON (pressed), the system control circuit 50 performs distance measurement processing to focus the lens 10 on an object to be photographed. Then, the system control circuit 50 performs photometry processing to determine the aperture value and shutter speed (S1104). Details of distance measurement processing and photometry processing will be described later. If necessary, the electronic flash is also set in photometry processing.

The system control circuit 50 checks the state of the shutter switch SW2 (S1105), and if the shutter switch SW2 is ON (pressed), shifts to photographing processing (S1107). If the shutter switch SW2 is OFF (not pressed), the system control circuit 50 checks the state of the shutter switch SW1 (S1106), if the shutter switch SW1 is ON, returns the processing to step S1105, and if OFF, returns the processing to the main routine.

If the shutter switch SW2 is ON, the system control circuit 50 executes photographing processing of writing image sensing data photographed by the image sensing element 14 in a predetermined area of the work memory 30 via the A/D converter 16, image processing circuit 20, and memory control circuit 22 (JPEG mode) or via the A/D converter and memory control circuit 22 (CDD-RAW mode) (S1107).

After photographing processing ends, the system control circuit 50 executes developing processing corresponding to the photographing mode (S1108). More specifically, the system control circuit 50 uses the image processing circuit 20 to perform developing processing such as predetermined pixel interpolation processing and color conversion processing for image sensing data read out from a predetermined area of the work memory 30, as needed. The system control circuit 50 stores the image sensing data having undergone developing processing in a predetermined area of the work memory 30.

The system control circuit 50 uses the compression/decompression circuit 32 to perform image compression processing corresponding to the set photographing mode for the image sensing data read out from the predetermined area of the work memory 30. Then, the system control circuit 50 stores the compressed image sensing data in a predetermined area of the work memory 30 (S1109).

The system control circuit 50 uses the encryption/decryption circuit 34 to perform predetermined encryption for the compressed image sensing data read out from the predetermined area of the work memory 30. The system control circuit 50 stores the encrypted image sensing data in a predetermined area of the work memory 30 (S1110). Note that the encrypted image sensing data can be decrypted by the encryption/decryption section 422 of the image gateway 400 or the encryption/decryption section 816 of the print service 800.

The system control circuit 50 repeats the processes in steps S1107 to S1110 until the shutter switch SW1 is determined in step S1111 to be turned off. After the shutter switch SW1 is turned off, the system control circuit 50 reads out image sensing data before encryption and compression that is stored in a predetermined area of the work memory 30, and executes quick review display of automatically playing back and displaying the image sensing data on the image display section 28 via the memory control circuit 22 and D/A converter 26 (S1121). Quick review display also displays a window which prompts the user to determine whether to upload the image sensing data to the image gateway 400.

If the user operates the selection/switching switch and determination/execution switch of the operation section 70 and selects "upload" (S1122), the system control circuit 50 advances the processing to step S1124. If NO in step S1122, the system control circuit 50 erases a series of image sensing data stored in a predetermined area of the work memory 30 (S1123), and returns the processing to the main routine.

If YES in step S1122, the system control circuit 50 displays on the image display section 28 a window for designating the print service 800 (S1124). If the user operates the selection/switching switch and determination/execution switch of the operation section 70 and selects the print service 800 (S1125), the system control circuit 50 sets information about the designated print service 800 and stores the information in the internal memory or work memory 30 (S1126). If NO in S1125, the system control circuit 50 sets information about the default print service 800 described above (S1127).

The system control circuit 50 reads out print service designation information stored in the internal memory or work memory 30 (S1128), and reads out identification information from the identification information memory 58 (S1129). The system control circuit 50 attaches the print service designation information and identification information to encrypted image sensing data stored in a predetermined area of the work memory 30, and transmits the resultant data to the image gateway 400 via the communication section 110 or the like (S1130).

By the above processing, image sensing data can be transferred to a desired print service 800 via the image gateway 400 and printed. Note that image sensing data transmitted to the image gateway 400 is image sensing data corresponding to an image selected to be uploaded on the quick review window by the user. The number of prints (default value is one) and the print size (default value is a service size) for each image sensing data can be set in print service designation information.

The system control circuit 50 reads out image sensing data before encryption and compression that is stored in a predetermined area of the work memory 30. The system control circuit 50 uses the image processing circuit 20 to create thinned (thumbnail) image data obtained by decreasing the number of pixels to a degree of recognizing, e.g., a photographed image. The system control circuit 50 records the thinned (thumbnail) image data on the recording medium 200 via the interface 90 and connector 92, and erases a series of image sensing data stored in the predetermined area of the work memory 30 (S1131). The thinned (thumbnail) image data may be created by decrypting and decompressing image sensing data transmitted in step S1103, or created parallel to creation of image sensing data transmitted to the image gateway 400.

The system control circuit 50 waits until it receives a command or data from the image gateway 400 (S1132). Upon reception of a command or data (error notification) representing that the image gateway 400 cannot normally receive image sensing data and attached data, the system control circuit 50 generates a warning by an image or sound by using the display section 54 and/or image display section 28 (S1135), and returns the processing to step S1121. If the system control circuit 50 receives receipt information from the image gateway 400, the circuit 50 stores the received receipt information in the internal memory, work memory 30, or recording medium 200 (S1136), and returns the processing to the main routine.

Receipt information is issued as a result of normally completing a series of processes of uploading image sensing data to the image gateway 400 and transferring the uploaded image sensing data to the print service 800. If an error occurs in the series of processes, an error notification is issued.

After image sensing data is transmitted to the image gateway 400 and stored, the transmitted image sensing data is erased. The storage capacities of the work memory 30 and recording medium 200 which store image sensing data can be reduced to minimum capacities necessary for photographing processing and playback processing (to be described later). Furthermore, the recording medium 200 can be omitted. This can provide a low-cost electronic camera 100 which uses a small-storage-capacity recording medium or incorporates a small-storage-capacity recording medium.

Distance Measurement Processing and Photometry Processing

Figure 9:
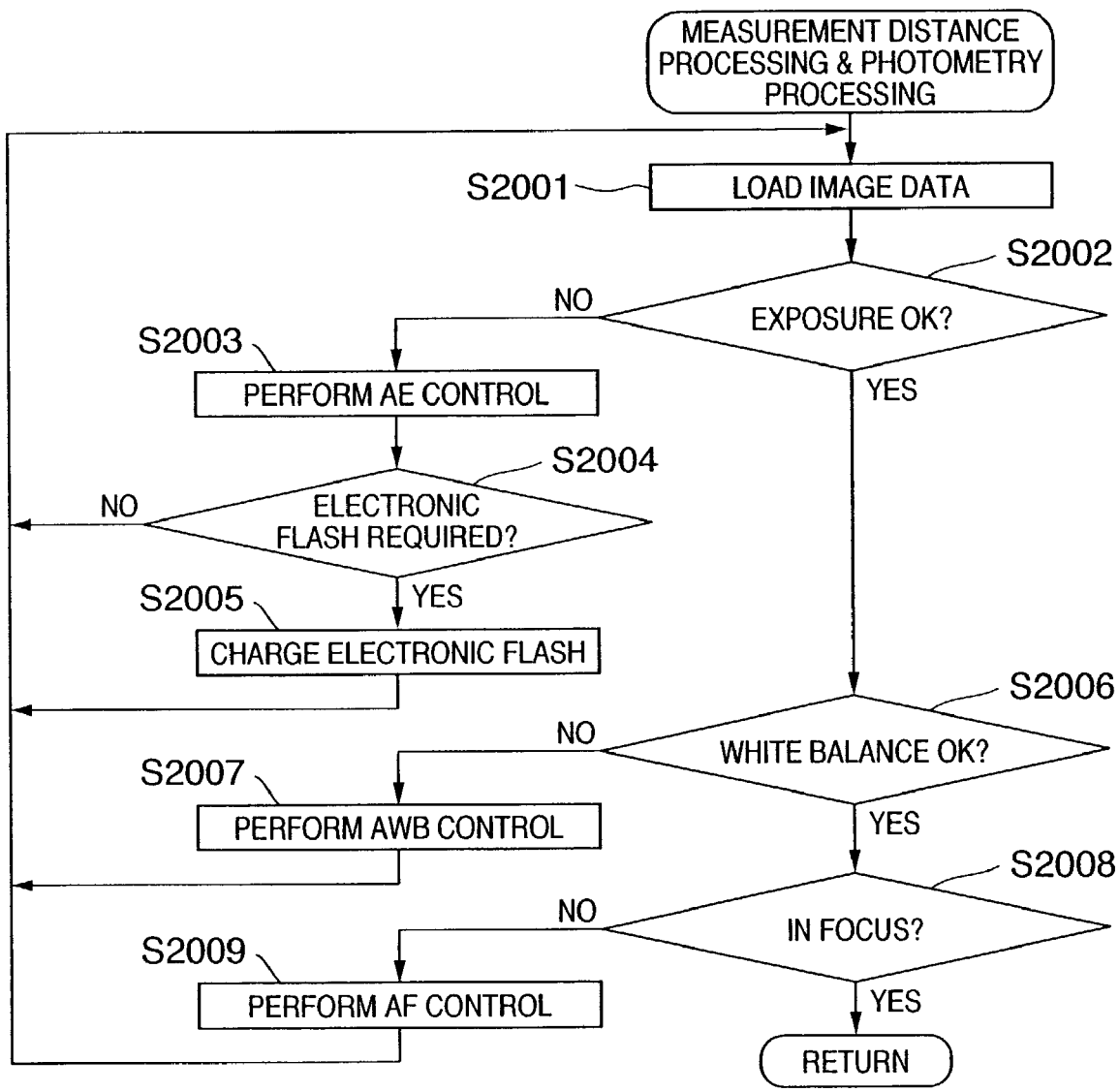
FIG. 9 is a flow chart showing details of distance measurement processing and photometry processing.

FIG. 9 is a flow chart showing details of distance measurement processing and photometry processing.

Image data are sequentially loaded to the image processing circuit 20 via the image sensing element 14 and A/D converter 16 (S2001). The image processing circuit 20 performs arithmetic operations for TTL AE processing, EF processing, AWB processing, and AF processing by using the sequentially loaded image data. These processes are done by extracting a necessary number of regions from the entire photographing region. In each processing, optimal arithmetic operations can be realized in different modes such as a center-weighted mode, average mode, and evaluation mode.

AE control using the exposure controller 40 is performed until exposure is determined in step S2002 to be proper on the basis of the arithmetic result of the image processing circuit 20 (S2003). Whether the electronic flash is required is determined using measurement data obtained by AE control (S2004). If YES in step S2004, the electronic flash flag is set, and the electronic flash 48 is charged (S2005). If YES in step S2002, measurement data and/or setting parameters are stored in the internal memory of the system control circuit 50 or the like.

AWB control of adjusting color processing parameters used by the image processing circuit 20 is performed until the white balance is determined in step S2006 to be proper on the basis of the arithmetic result of the image processing circuit 20 and measurement data obtained by AE control (S2007). If YES in step S2006, measurement data and/or setting parameters are stored in the internal memory of the system control circuit 50 or the like.

AF control using the distance measurement controller 42 is performed until the lens is determined in step S2008 to be in focus by using measurement data obtained by AE control and AWB control (S2009). If YES in step S2008, measurement data and/or setting parameters are stored in the internal memory of the system control circuit 50 or the like. Then, distance measurement processing and photometry processing end.

Photographing Processing

Figure 10:
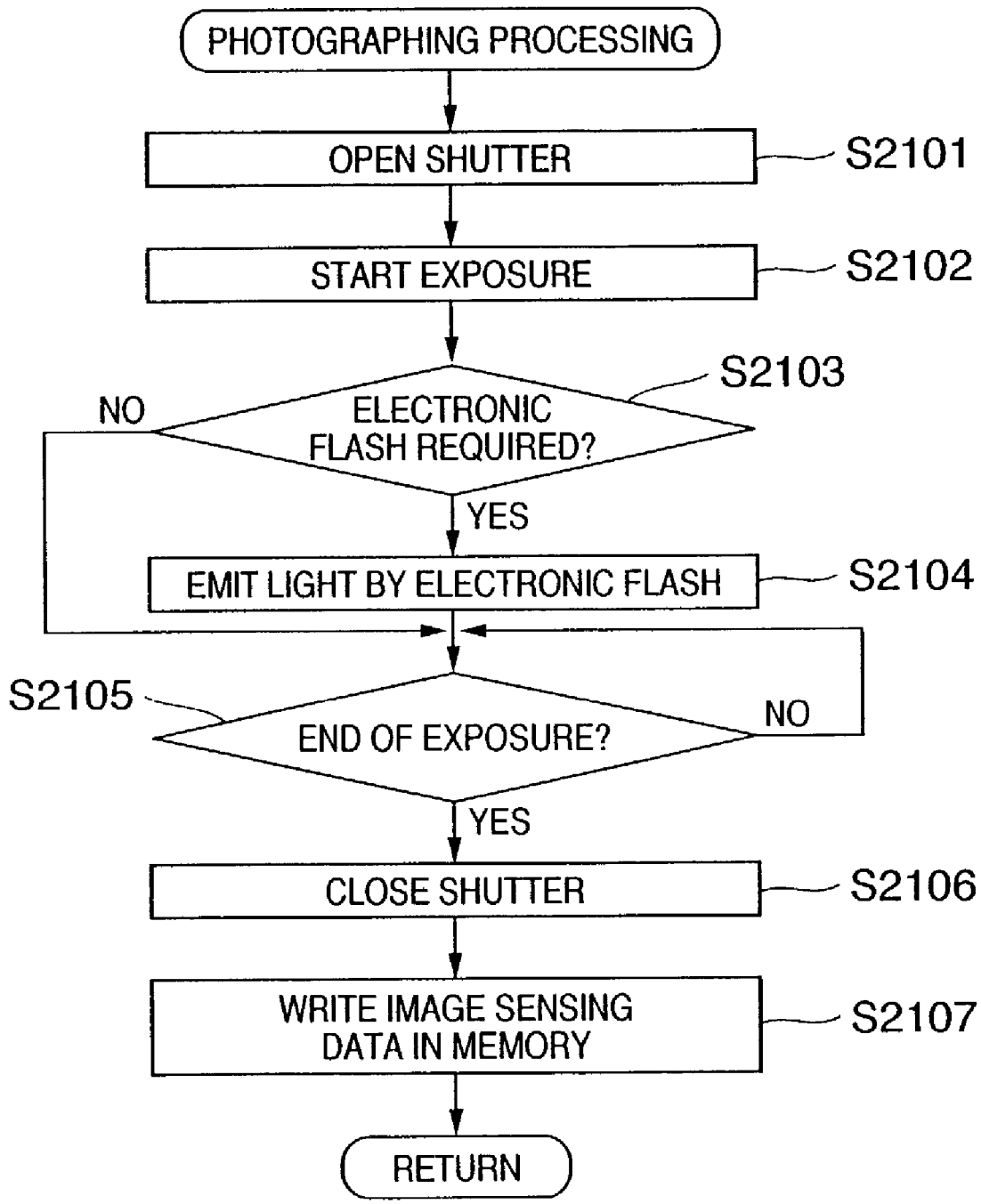
FIG. 10 is a flow chart showing details of photographing processing.

FIG. 10 is a flow chart showing details of photographing processing.

The exposure controller 40 opens the shutter 12 having an aperture function in accordance with the aperture value based on photometry data stored in the internal memory of the system control circuit 50 or the like (S2101), and starts exposure of the image sensing element 14 (S2102). Subsequently, whether the electronic flash is required is determined from the above-described electronic flash flag (S2103), and if YES in step S2103, the electronic flash 48 emits light (S2104).

Based on photometry data, the processing waits until exposure of the image sensing element 14 ends (S2105). After exposure ends, the shutter 12 is closed (S2106), and charge signals are read out from the image sensing element 14. Image sensing data is written in the work memory 30 via the A/D converter 16, image processing circuit 20, and memory control circuit 22 (JPEG mode) or via the A/D converter 16 and memory control circuit 22 (CCD-RAW mode) (S2107), and photographing processing ends.

Playback Processing

Figure 11:
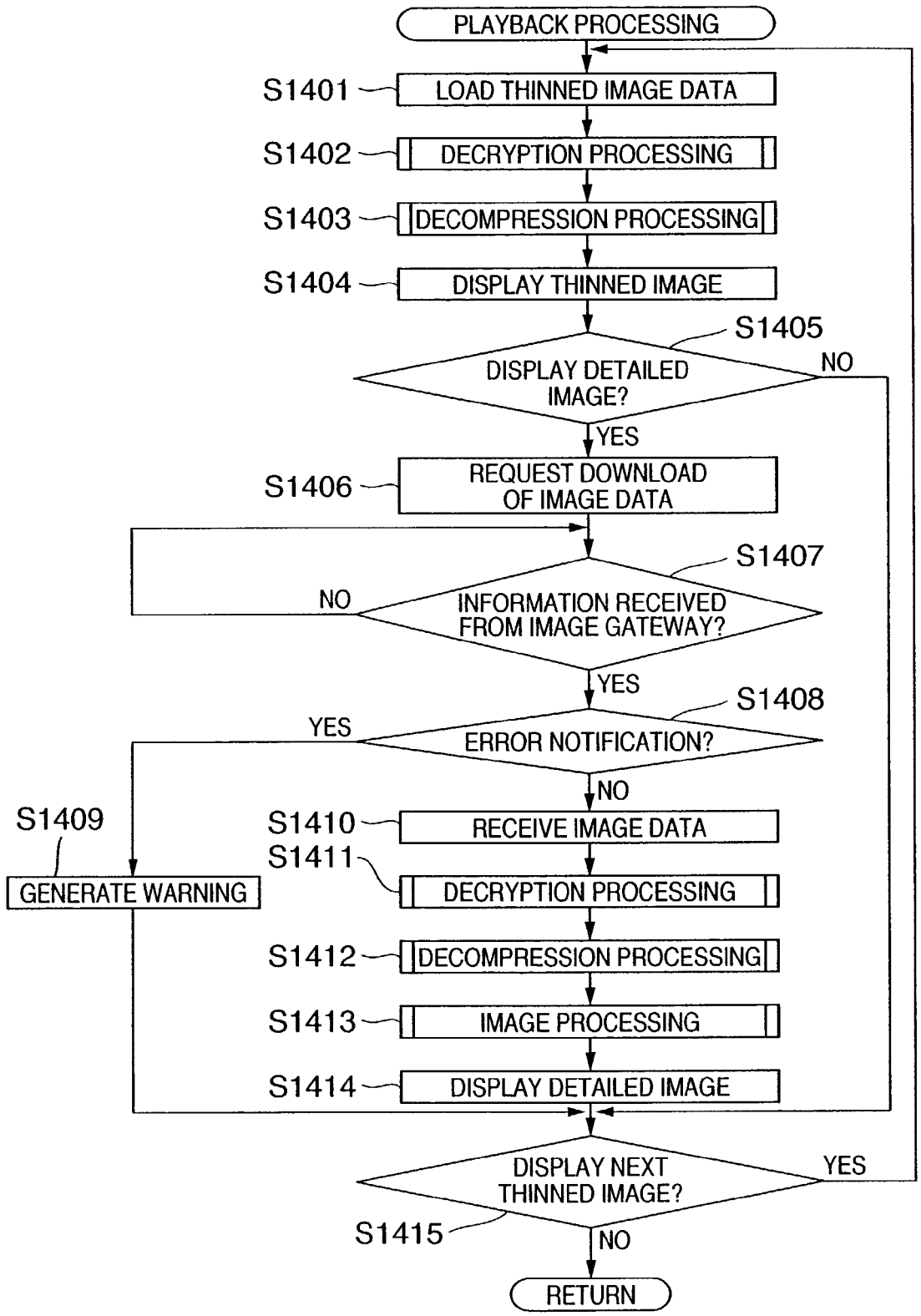
FIG. 11 is a flow chart showing details of playback processing.

FIG. 11 is a flow chart showing details of playback processing.

The system control circuit 50 copies thinned (thumbnail) image data from a predetermined area of the work memory 30 or the recording medium 200 to another predetermined area of the work memory 30 (S1401). If necessary, the system control circuit 50 executes predetermined decryption processing and decompression processing by using the encryption/decryption circuit 34 and compression/decompression circuit 32 (S1402 and S1403). The system control circuit 50 displays the thinned (thumbnail) image on the image display section 28 via the memory control circuit 22 and D/A converter 26 (S1404).

If the user operates the selection/switching switch and determination/execution switch of the operation section 70 and requests display of a detailed image corresponding to the thinned (thumbnail) image (S1405), the system control circuit 50 requests the image gateway 400 via the communication section 110 or the like to download detailed image data corresponding to the thinned (thumbnail) image data (S1406). Since identification information is added to the download request, the image gateway 400 can identify the download request issuing source and determine whether download is possible.

The system control circuit 50 waits until it receives a command or data from the image gateway 400 (S1407). Upon reception of a command or data, the system control circuit 50 checks whether the command is an error notification (S1408). If YES in step S1408, the system control circuit 50 displays a predetermined warning by an image or sound by using the display section 54 and/or image display section 28 (S1409), and advances the processing to step S1415.

If the system control circuit 50 receives image data from the image gateway 400, the circuit 50 stores the received image data in a predetermined area of the work memory 30 (S1410). The system control circuit 50 uses the encryption/decryption circuit 34 and compression/decompression circuit 32 to perform predetermined decryption processing and decompression processing for the received image data read out from the predetermined area of the work memory 30 (S1411 and S1412). If necessary, the system control circuit 50 performs predetermined image processing (developing processing) by using the image processing circuit 20 (S1413). The system control circuit 50 displays the detailed image on the image display section 28 via the memory control circuit 22 and D/A converter 26 (S1414).

If the user operates the selection/switching switch and determination/execution switch of the operation section 70 and designates display of the next thinned image (S1415), the system control circuit 50 returns the processing to step S1401. If the user designates the end of the processing mode, the system control circuit 50 returns the processing to the main routine.

After playback processing ends, the system control circuit 50 deletes image data which is stored in the work memory 30 and used to display a detailed image.

Print Service Processing

Print service processing is processing executed when the user of the electronic camera 100 visits the print service 800 (e.g., the shop of the print laboratory technician) and receives the print of image sensing data requested via the image gateway 400. The user of the electronic camera 100 or the clerk of the print service 800 sets the electronic camera 100 to the print service mode, displays receipt information on the image display section 28 and/or display section 54, and receives/hands a print corresponding to the receipt information.

Figure 12:
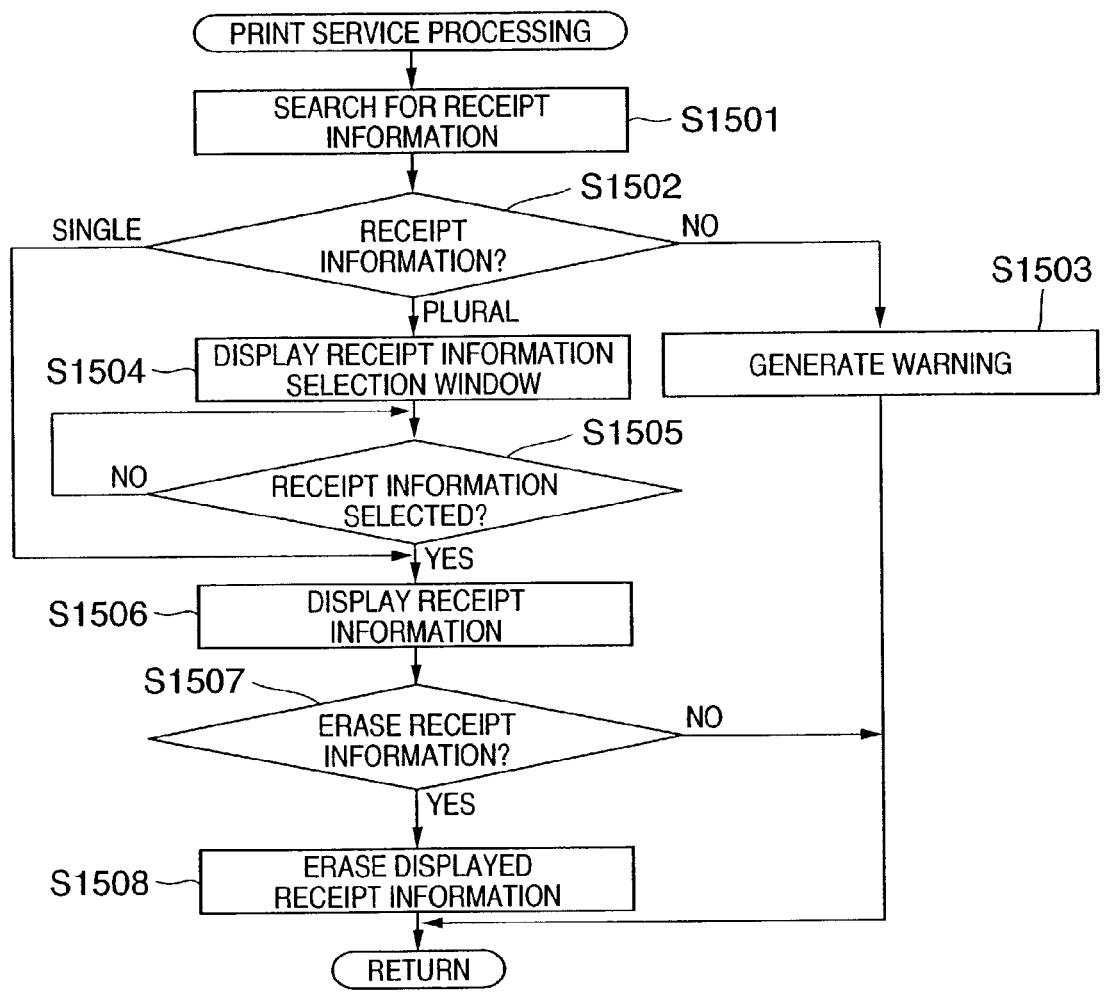
FIG. 12 is a flow chart showing details of print service processing.

FIG. 12 is a flow chart showing details of print service processing.

The system control circuit 50 searches for receipt information stored in the internal memory, work memory 30, or recording medium 200 (S1501), and checks the presence/absence of receipt information and the number of pieces of receipt information (S1502). If no receipt information exists, the system control circuit 50 generates a predetermined warning by an image or sound by using the display section 54 and/or image display section 28 (S1503), and returns the processing to the main routine.

If single receipt information exists, the system control circuit 50 reads out the receipt information and displays it on the display section 54 and/or image display section 28 (S1506). If a plurality of pieces of receipt information exist, the system control circuit 50 displays on the display section 54 and/or image display section 28 a receipt information selection window for selecting receipt information (S1504). The system control circuit 50 waits until receipt information is selected (S1505). If the user of the electronic camera 100 or the clerk of the print service 800 operates the selection/switching switch and determination/execution switch of the operation section 70 and selects receipt information, the system control circuit 50 reads out the selected receipt information and displays it on the display section 54 and/or image display section 28 (S1506).

If the user of the electronic camera 100 or the clerk of the print service 800 operates the selection/switching switch and determination/execution switch of the operation section 70 and designates erase of receipt information (S1507), the system control circuit 50 erases the displayed receipt information (S1508), and returns the processing to the main routine.

[Operation of Image Gateway]

Figure 13:
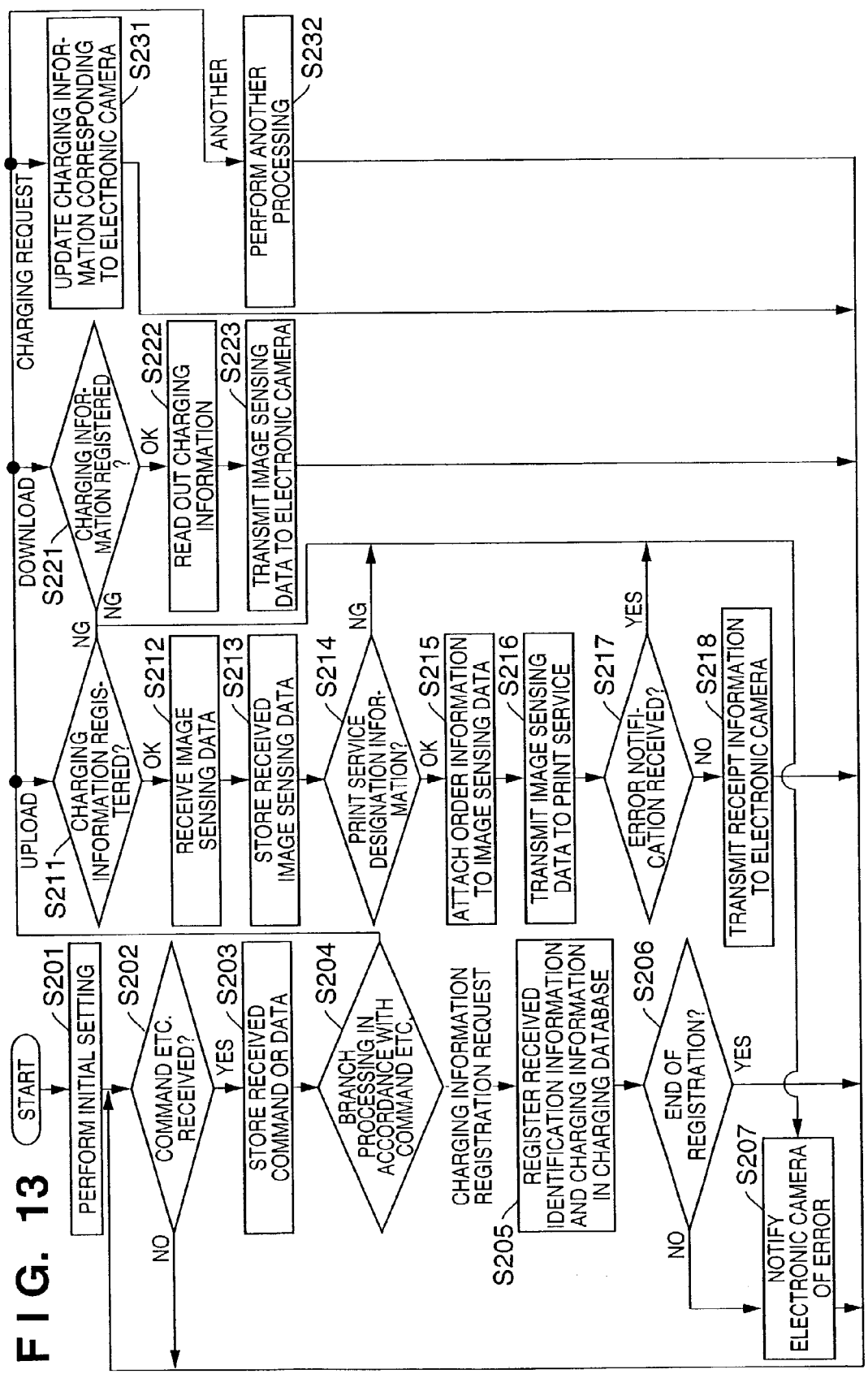
FIG. 13 is a flow chart showing the main routine of the image gateway.

The operation of the image gateway 400 will be explained. FIG. 13 is a flow chart showing the main routine of the image gateway 400.

When the image gateway 400 is powered on, the controller 402 initializes flags, registers, control variables, and the like. The controller 402 loads a program such as an operating system (OS) stored in the HDD 410 to the storage section 404, and executes the program. The controller 402 initializes the respective sections of the image gateway 400 (S201).

The controller 402 checks whether a command or data has been received from the electronic camera 100 via the communication section 414 or the like or from the print service 800 via the communication section 416 (S202). If YES in step S202, the controller 402 stores the command and/or data received from the electronic camera 100 or print service 800, and information attached to the command and/or data in a predetermined area of the storage section 404 or HDD 410 (S203).

The controller 402 checks the received command or data, and branches the processing (S204). More specifically, the controller 402 advances the processing to step S205 if the command or data is a command or data which is transmitted from the electronic camera 100 and concerns a charging information registration request, to step S211 if the command is a command which is transmitted from the electronic camera 100 and concerns upload of image sensing data, to step S221 if the command is a command which is transmitted from the electronic camera 100 and concerns download of image sensing data, or to step S231 if the command is a charging request with respect to the electronic camera 100 that is transmitted from the print service 800.

Charging Information Registration Request

If the controller 402 receives a command which requests registration of charging information, the controller 402 registers received charging information and identification information in the charging information database 421 by using the charging management section 420 (S205). The controller 402 checks whether registration in the charging database 421 normally ends (S206). If YES in step S206, the controller 402 returns the processing to step S202; if NO, sends back an error notification to the electronic camera 100 via the communication section 414 or the like (S207), and returns the processing to step S202.

In this manner, the account of the electronic camera 100 is registered in the charging information database 421 by using identification information unique to the electronic camera 100. Various services provided by the image gateway 400 such as the management service of uploaded image sensing data and the print service of image sensing data can be provided to the electronic camera 100 in synchronism with charging management by the charging management section 420, image storage management by the image storage section 418, and decryption processing by the encryption/decryption section 422.

Upload of Image Sensing Data

If the controller 402 receives a command which requests upload of image sensing data, the controller 402 checks the registration status of charging information on the basis of identification information attached to the command (S211). If the charging information is not registered correctly, the controller 402 sends back an error notification to the electronic camera 100 via the communication section 414 or the like (S207), and returns the processing to step S202.

If charging information is registered correctly, the controller 402 receives image sensing data from the electronic camera 100 via the communication section 414 or the like (S212). The controller 402 stores the received image sensing data in a predetermined area of the image storage section 418 (S213), and checks the state of print service designation information attached to the image sensing data (S214). If the print service designation information is NG, the controller 402 sends back an error notification to the electronic camera 100 (S207), and returns the processing to step S202.

If the print service designation information is OK, the controller 402 attaches information corresponding to receipt information such as order information to the image sensing data read out from the image storage section 418 (S215). The controller 402 transmits the image sensing data via the communication section 416 or the like to a print service 800 designated by the print service designation information (S216).

The controller 402 checks whether it has received an error notification from the print service 800 (S217). If YES in step S217, the controller 402 sends back the error notification to the electronic camera 100 via the communication section 414 or the like (S207), and returns the processing to step S202.

If the controller 402 receives from the print service 800 a notification representing that the print service 800 has normally received the image sensing data, the controller 402 transmits receipt information to the electronic camera 100 via the communication section 414 or the like (S218), and returns the processing to step S202.

Order information includes identification information of the electronic camera 100, and information such as the number of prints and the print size for each image sensing data that are set in print service designation information. Based on the order information, the print service 800 can grasp the contents of an image sensing data print request received from the image gateway 400. Also, the print service 800 can collate order information displayed on the display section 806 with receipt information displayed on the image display section 28 and/or display section 54 of the electronic camera 100, thereby allowing a clerk to hand a print to an authentic user of the electronic camera 100 and recover the cost.

The print fee is paid by requesting the charging management section 420 of the image gateway 400 to charge the electronic camera 100 from the print service 800.

Receipt information can include a due date and time when a print is completed and can be handed.

Download of Image Sensing Data

If the controller 402 receives a command which requests download of image sensing data, the controller 402 checks the registration status of charging information on the basis of identification information attached to the command (S221). If the charging information is not registered correctly, the controller 402 sends back an error notification to the electronic camera 100 via the communication section 414 or the like (S207), and returns the processing to step S202.

If charging information is registered correctly, the controller 402 reads out image sensing data stored in a predetermined area of the image storage section 418 on the basis of the identification information attached to the command (S222). The controller 402 transmits the readout image sensing data to the electronic camera 100 via the communication section 414 or the like (S223), and returns the processing to step S202.

Charging Request

If the controller 402 receives a charging request with respect to the electronic camera 100 from the print service 800, the controller 402 uses the charging management section 420 to update charging information of the electronic camera 100 that has been registered in the charging database 421 (S231), and returns the processing to step S202.

If the controller 402 receives a command and/or data other than the above-mentioned ones, the controller 402 executes processing corresponding to the received command and/or data (S232), and returns the processing to step S202.

[Operation of Print Service]

Figure 14:
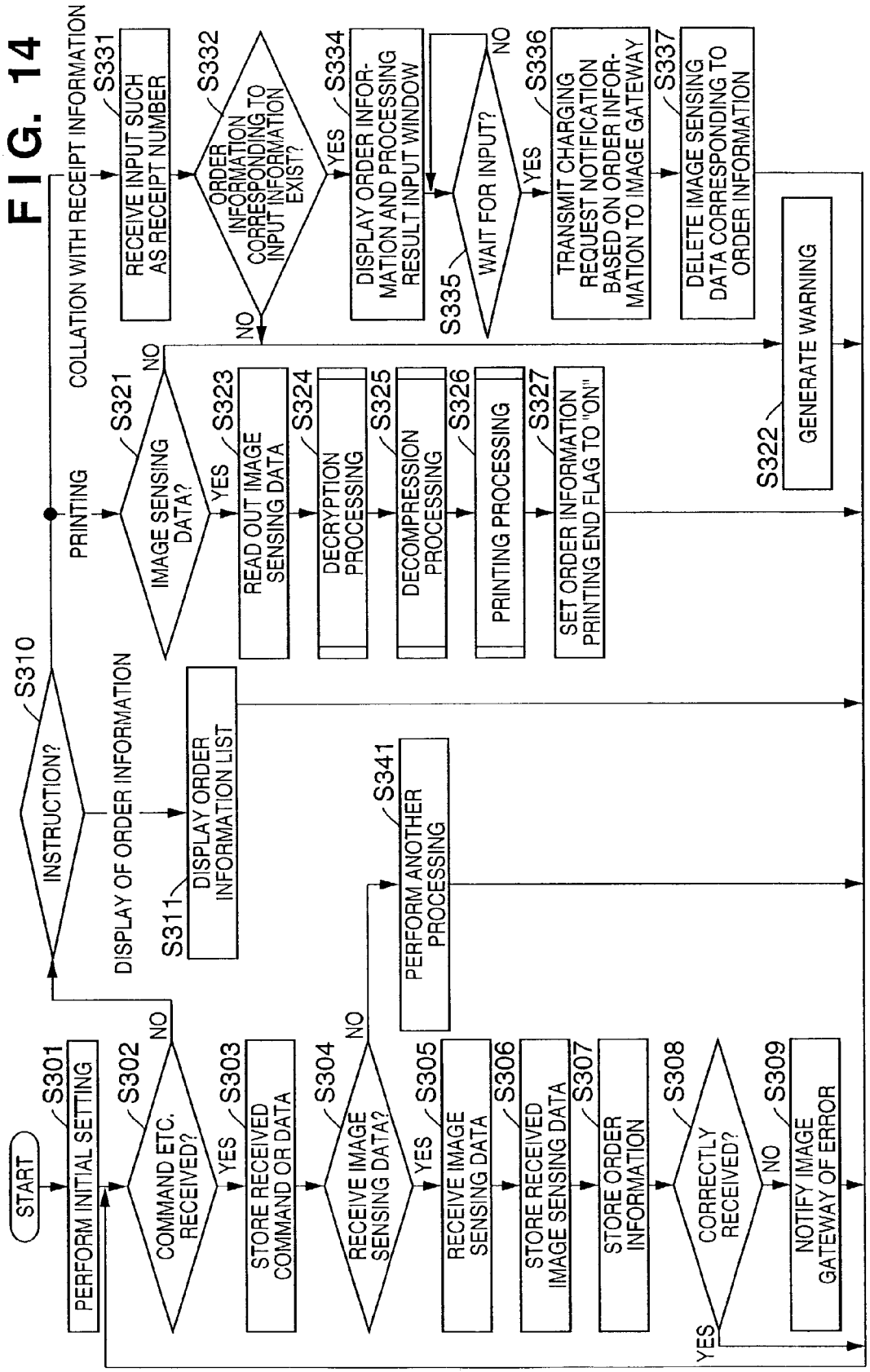
FIG. 14 is a flow chart showing the main routine of the print service.

The operation of the print service 800 (and 810) will be explained. FIG. 14 is a flow chart showing the main routine of the print service 800 (and 810).

When the information processing apparatus 800 which provides a print service is powered on, the controller 802 initializes flags, registers, control variables, and the like. The controller 802 loads a program such as an operating system (OS) stored in the HDD 810 to the storage section 804, and executes the program. The controller 802 initializes the respective sections of the information processing apparatus 800 (S301).

The controller 802 checks whether a command or data has been received from the image gateway 400 via the communication section 814 or the like (S302). If YES in step S302, the controller 802 stores the command and/or data received from the image gateway 400, and information attached to the command and/or data in a predetermined area of the storage section 804 or HDD 810 (S303).

Reception of Image Sensing Data

The controller 802 checks the received command or data (S304). If the controller 802 has received a command which requests reception of image sensing data, the controller 802 receives image sensing data via the communication section 814 or the like (S305). The controller 802 stores the received image sensing data in a predetermined area of the storage section 804 and/or a predetermined area of the HDD 810 (S306), and stores order information attached to the image sensing data in a predetermined area of the storage section 804 and/or a predetermined area of the HDD 810 (S307). The controller 802 checks whether these data have normally been received (S308). If YES in step S308, the controller 802 returns the processing to step S302; if NO, sends back an error notification to the image gateway 400 via the communication section 814 or the like (S309), and returns the processing to step S302.

If a command and/or data other than the command which requests reception of image sensing data is received, the controller 802 executes processing corresponding to the received command and/or data (S341), and returns the processing to step S202.

The controller 802 checks an instruction input via the operation section 808 (S310), and branches the processing in accordance with the instruction. More specifically, the controller 802 advances the processing to step S311 if display of order information stored in the HDD 810 or the like is designated, to S321 if printing of image sensing data stored in the HDD 810 or the like is designated, or to step S331 if collation with receipt information is designated.

Display of Order Information

If display of order information is designated, the controller 802 displays on the display section 806 (or prints by the printing section 820) a list of pieces of order information stored in the HDD 810 or the like (S311), and returns the processing to step S302. From the displayed list, the clerk of the print service 800 can grasp the status of an ordered print.

Printing of Image Sensing Data

If printing of image sensing data is designated, the controller 802 checks whether the image sensing data designated to be printed is stored in a predetermined area of the HDD 810 or the like (S321). If NO in step S321, the controller 802 generates a predetermined warning by an image or sound by using the display section 806 (S322), and returns the processing to step S302.

If YES in step S321, the controller 802 reads out the image sensing data (S323), performs predetermined decryption processing using the encryption/decryption section 816 (S324), and performs predetermined decompression processing using the compression/decompression section 818 (S325). The controller 802 executes printing corresponding to the contents of the order information by using the printing section 820 (S326). After printing ends, the controller 802 sets a corresponding order information printing end flag to "ON" (S327), and returns the processing to step S302.

By this processing, printing of the image sensing data is executed in accordance with the number of prints and the print size for each image sensing data. Note that a number or sign representing a print which corresponds to given order information is added to the back surface or corner of the print.

Although not shown in FIG. 14, printing of image sensing data can also be designated by transmitting a printing instruction command from the image gateway 400 to the print service 800. In this case, printing of image sensing data can start subsequent to reception of the image sensing data.

Collation with Receipt Information

If collation with receipt information is designated, the controller 802 receives input of an exchange number or order number contained in receipt information from the operation section 808 (S331), and checks whether order information corresponding to the input information exists (S332). The input information is part of receipt information displayed on the image display section 28 of the electronic camera 100 of the user.

If NO in step S332, the controller 802 generates a predetermined warning by an image or sound by using the display section 806 (S322), and returns the processing to step S302. If YES in step S332, the controller 802 displays on the display section 806 the order information and a window for allowing the clerk of the print service 800 to input a processing result (S334), and waits for an input from the operation section 808 (S335). If the controller 802 receives an input from the operation section 808, the connector 82 executes processing corresponding to the input.

Examples of processing corresponding to the input are "the print was handed.", "reprint", "add a print (anther print)", and "cancel the print". FIG. 14 shows only processing corresponding to "the print was handed.". If the "the print was handed." is input from the operation section 808, the controller 802 transmits the above-mentioned charging request notification based on order information to the image gateway 400 (S336). The controller 802 deletes image sensing data corresponding to the order information (S337), and returns the processing to step S302.

[Data Flow]

Figure 15:
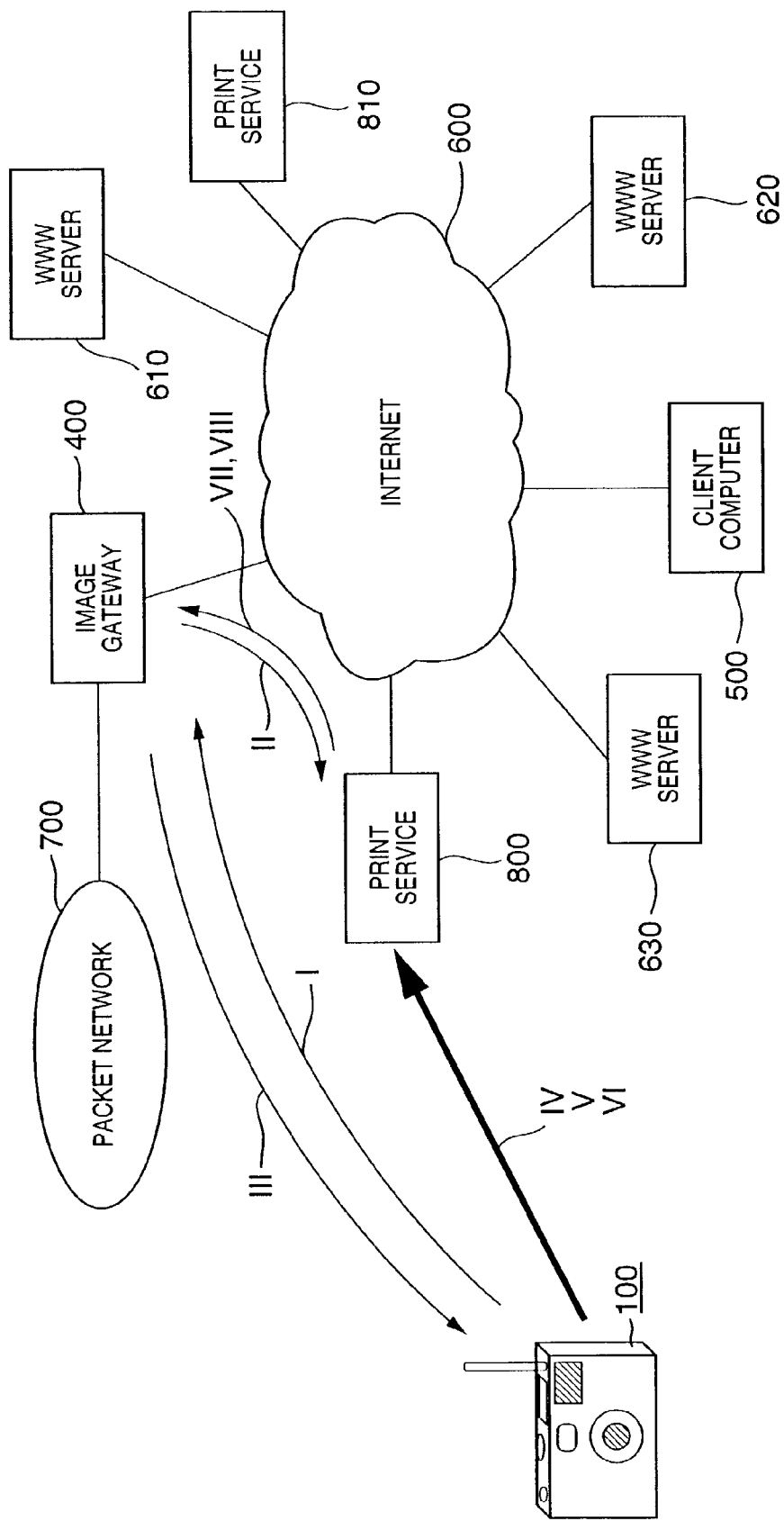
FIG. 15 is a view showing a data flow and the like between the electronic camera, the image gateway, and the print service.

FIG. 15 is a view showing a data flow and the like between the electronic camera 100, the image gateway 400, and the print service 800.

(1) The user of the electronic camera 100 designates a print service and uploads image sensing data to the image gateway 400.

(2) The image gateway 400 transmits to the print service 800 the image sensing data to which order information corresponding to receipt information is attached.

(3) The image gateway 400 transmits the receipt information to the electronic camera 100.

(4) The user of the electronic camera 100 displays the receipt information at the shop of the print service 800.

(5) The clerk of the print service 800 displays order information corresponding to the receipt information.

(6) The clerk of the print service 800 collates the receipt information and order information, and hands the print to the user of the electronic camera 100.

(7) After the print is handed, the print service 800 notifies the image gateway 400 of a charging request.

(8) The image gateway 400 updates charging information of the electronic camera 100.

In this way, the user of the electronic camera 100 can request the print service to print images photographed by the electronic camera 100 regardless of the date and time or the place as far as the electronic camera 100 can communicate with the image gateway 400. The print service 800 (or 810) sequentially prints image sensing data received via the image gateway 400. When the user visits the shop with the electronic camera 100 carried with him/her in order to receive the prints, the prints can be easily, accurately handed within a short time by collating receipt information and order information.

The print service 800 can collect the print fee by requesting the image gateway 400 to charge the electronic camera 100.

The user of the electronic camera 100 need not save image sensing data to be printed in the memory of the electronic camera 100 or the recording medium 200, and can order prints by a simple procedure. A convenient print service can be provided to the user of the electronic camera 100, and the print service 800 can be efficiently used.

Second Embodiment

An image processing apparatus according to the second embodiment of the present invention will be described. In the second embodiment, the same reference numerals as in the first embodiment denote the same parts, and a detailed description thereof will be omitted.

In the first embodiment, the electronic camera 100 has a communication function with the image gateway 400. In the second embodiment, a communication device 300 having a communication function with an image gateway 400 is combined with an electronic camera 100.

FIG. 16 is a view showing a system configuration according to the second embodiment.

In FIG. 16, the communication device 300 is a portable telephone having communication sections 326 and 330, and antennas 328 and 332. The communication device 300 can communicate with a communication section 114 of the electronic camera 100 via the antenna 332 and communication section 330. The communication device 300 can communicate voice and data with a packet network 700 via the communication section 326 and antenna 328.

The communication section 326 has a portable telephone communication function of TDMA (Time Division Multiple Access) scheme, CDMA (Code Division Multiple Access) scheme, W-CDMA (Wideband Code Division Multiple Access) scheme, or PHS (Personal Handy-phone System) scheme. The communication section 330 has a wireless communication function such as Bluetooth.

The communication device 300 comprises a microphone 310 which converts voice into an electrical signal, a loudspeaker 318 which converts an electrical signal into a voice signal, a communication system control circuit 350 (not shown) which controls the overall communication device 300, and a display section 360 which displays an operation state, message, or the like using characters, images, and sound. The display section 360 is made up of an LCD, sound generating element, and the like. A single or plurality of display sections 360 are set at easy-to-see positions near the operation section of the communication device 300.

The communication device 300 comprises an operation section 362 for inputting various operation instructions. The operation section 362 is constructed by a switch, a dial, a touch panel, a pointing device by line-of-sight detection, or a voice recognition device singly or by a combination of them. The operation section 362 enables power-on/off operation of the communication device 300, execution (offhook)/stop (on-hook) of speech communication, input of a telephone number, search for a telephone number, switching of the communication mode.

When the communication device 300 receives an incoming call from another device or a communication base station, a termination notifying section 364 notifies the user of the communication device 300 of the incoming call by using sound such as a ringing tone, voice tone, or music, and/or an image such as an icon, moving picture, still picture, or light emission, or vibration and/or light.

The communication device 300 comprises a connector for connecting the communication device 300 to another device instead of the antenna 332 when the communication section 330 performs wire communication.

The electronic camera 100 has the communication section 114 and an antenna 116. The communication section 114 has a wireless communication function such as Bluetooth. The communication section 114 may have various communication functions including wire communication such as RS232C, USB, IEEE 1394, IEEE 1284, SCSI, MODEM, and LAN, infrared communication such as IrDA (Infrared Data Association), and optical communication. Similarly, the communication section 330 of the communication device 300 may have various communication functions including wire communication such as RS232C, USB, IEEE 1394, IEEE 1284, SCSI, MODEM, and LAN, infrared communication such as IrDA, and optical communication.

The communication device 300 relays packets from the electronic camera 100 to the packet network 700 and/or from the packet network 700 to the electronic camera 100 when the electronic camera 100 communicates with the image gateway 400 via the packet network 700.

The electronic camera 100 and communication device 300 authenticate each other, and share their setting information, identification information, and receipt information. In place of the electronic camera 100, the communication device 300 can perform an operation of transmitting/receiving image sensing data and commands to/from the image gateway 400.

Receipt information sent back from the image gateway 400 is saved in the internal memory of the communication device 300, and can be displayed on the display section 360 of the communication device 300. The user of the electronic camera 100 visits the shop of a print service 800 or the like with the communication device 300 carried with him/her, displays receipt information on the communication device 300, and can receive a print. In this case, print service processing may be executed in the communication device 300.

Modification

In each of the above-described embodiments, which of print services is to be used is initially set by using address information input as charging information, or selection candidates are displayed, in order to transmit image sensing data from the electronic camera 100 to the image gateway 400, transfer the image sensing data from the image gateway 400 to the print service 800 (or 810), and print the image sensing data. Alternatively, the image gateway 400 may notify the electronic camera 100 (or communication device 300) of a default print service or selection candidates on the basis of address information of received charging information.

In the second embodiment, the clerk of the print service 800 collates receipt information displayed on the display section 360 of the communication device 300 with order information, and hands a print to the user of the electronic camera 100, i.e., communication device 300. Then, the clerk requests the charging management section 420 of the image gateway 400 to charge the electronic camera 100, and collects the print fee. Alternatively, not the electronic camera 100 but the communication device 300 may be charged. In this case, in registering charging information in the image gateway 400, not charging information of the electronic camera 100 but charging information of the communication device 300 is registered in the charging database 421.

In each embodiment, one electronic camera 100, one image gateway 400, and two print services are arranged. However, the number of cameras, gateways, or print services can be arbitrarily set to one or more. Also, the number of packet networks 700 including a portable telephone base station may be one or more.

The recording medium 200 is not limited to a memory card such as a PCMCIA card, CF card, MMC (MultiMedia Card), or SD card, or a hard disk, and may be a micro DAT (Digital Audio Tape), an optical disk such as a magnetooptical disk, CD-R, or CD-RW, or a phase change disk such as a DVD-ROM. The recording medium 200 may be a composite recording medium of a memory card and hard disk, or a partially detachable composite recording medium. The recording medium 200 is incorporated in the electronic camera 100 in each embodiment, but may be freely detachable from the electronic camera 100. The number of recording media 200 which can be incorporated in or detached from the electronic camera 100 can be arbitrarily set to one or more.

The above-mentioned receipt information is preferably a two-dimensional bar code. Order information included in the receipt information is not entirely formed from a two-dimensional bar code, but privacy information such as an order number, user information, and camera number is formed from a bar code, and information such as the receipt date and time and the fee necessary to be confirmed before receipt is not encoded. The bar code displayed on the LCD of the camera which has received receipt information is read to collate the user and camera number. This enables collation on only the camera which has received receipt information, enhancing the security. The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An electronic camera that communicates with an image gateway apparatus through a network, the image gateway apparatus transferring image data received from the electronic camera to a print service apparatus, the electronic camera comprising:
   a developing unit that performs a developing process on image data obtained by shooting an object, and that stores the image data in a memory;
   an uploading unit that uploads the image data, which is stored in the memory by said developing unit, to the image gateway apparatus;
   a receiving unit that receives receipt information for receiving a printout of the uploaded image data from the image gateway apparatus, and stores the received receipt information in the memory, wherein the receipt information indicates that the print service apparatus has performed a printing process on the uploaded image data; and
   an erasing unit that erases the receipt information stored in the memory after the receipt information is displayed on a display of the electronic camera in order to certify whether or not a person who wants to receive the printout is a proper recipient of the printout.

2. The electronic camera according to claim 1, wherein said receiving unit receives an error notification from the image gateway apparatus when the image gateway apparatus cannot normally receive the image data uploaded by said uploading unit.

3. The electronic camera according to claim 1, further comprising a designator that designates the print service apparatus that is to receive the image data from the image gateway apparatus, wherein said uploading unit uploads the image data together with designation information which designates the print service apparatus.

4. A method of handling image data shot by an electronic camera which communicates with an image gateway apparatus through a network, the image gateway apparatus transferring image data received from the electronic camera to a print service apparatus, the method comprising the steps of:
   performing a developing process by the electronic camera on image data obtained by shooting an object, and storing the image data in a memory of the electronic camera;
   uploading, by the electronic camera, the image data, which is stored in the memory in the developing process, to the image gateway apparatus,
   receiving, by the electronic camera, receipt information for receiving a printout of the uploaded image data from the image gateway apparatus, and storing the received receipt information in the memory, wherein the receipt information indicates that the print service apparatus has performed a printing process on the uploaded image data; and
   erasing the receipt information stored in the memory after the receipt information is displayed on a display of the electronic camera in order to certify whether or not a person who wants to receive the printout is a proper recipient of the the printout.

5. A computer readable storage medium on which is stored a computer executable program for executing a method of handling image data shot by an electronic camera which communicates with an image gateway apparatus through a network, the image gateway apparatus transferring image data received from the electronic camera to a print service apparatus, the method comprising the steps of:
   performing a developing process by the electronic camera on image data obtained by shooting an object, and storing the image data in a memory of the electronic camera;
   uploading, by the electronic camera, the image data, which is stored in the memory in the developing process, to the image gateway apparatus,
   receiving, by the electronic camera, receipt information for receiving a printout of the uploaded image data from the image gateway apparatus, and storing the received receipt information in the memory, wherein the receipt information indicates that the print service apparatus has performed a printing process on the uploaded image data; and
   erasing the receipt information stored in the memory after the receipt information is displayed on a display of the electronic camera in order to certify whether or not a person who wants to receive the printout is a proper recipient of the printout.

* * * * *